(12) United States Patent
Kocher et al.

(10) Patent No.: US 11,797,683 B2
(45) Date of Patent: *Oct. 24, 2023

(54) SECURITY CHIP WITH RESISTANCE TO EXTERNAL MONITORING ATTACKS

(71) Applicant: Cryptography Research, Inc., San Jose, CA (US)

(72) Inventors: Paul C. Kocher, San Francisco, CA (US); Pankaj Rohatgi, Los Altos, CA (US); Joshua M. Jaffe, San Francisco, CA (US)

(73) Assignee: Cryptography Research, Inc., San Jose, CA (US)

(*) Notice: Subject to any disclaimer, the term of this patent is extended or adjusted under 35 U.S.C. 154(b) by 19 days.

This patent is subject to a terminal disclaimer.

(21) Appl. No.: 17/382,333

(22) Filed: Jul. 21, 2021

(65) Prior Publication Data

US 2022/0083665 A1 Mar. 17, 2022

Related U.S. Application Data

(63) Continuation of application No. 16/240,671, filed on Jan. 4, 2019, now Pat. No. 11,074,349, which is a
(Continued)

(51) Int. Cl.
*G06F 21/57* (2013.01)
*G06F 21/60* (2013.01)
(Continued)

(52) U.S. Cl.
CPC .......... *G06F 21/575* (2013.01); *G06F 8/71* (2013.01); *G06F 9/44505* (2013.01);
(Continued)

(58) Field of Classification Search
CPC ...... G06F 21/575; G06F 8/71; G06F 9/44505; G06F 12/1408; G06F 21/556;
(Continued)

(56) References Cited

U.S. PATENT DOCUMENTS 4,694,491 A 9/1987 Horne et al.
4,908,038 A 3/1990 Matsumura et al.
(Continued)

FOREIGN PATENT DOCUMENTS

EP 0781003 A2 6/1997
JP 2002-520905 A 7/2002
(Continued)

OTHER PUBLICATIONS

Advanced Access Content System (AACS), Introduction and Common Cryptographic Elements, Revision 09.1 (Feb. 17, 2006), available at http://www.aacsla.com/specifications/specs091/AACS_Spec_Common_0.91.pdf. 82 Pages.
(Continued)

*Primary Examiner* — David Garcia Cervetti
(74) *Attorney, Agent, or Firm* — Lowenstein Sandler LLP

(57) ABSTRACT

A method for performing a security chip protocol comprises receiving, by processing hardware of a security chip, a message from a first device as part of performing the security chip protocol. The processing hardware retrieves a secret value from secure storage hardware operatively coupled to the processing hardware. The processing hardware determines a path through a key tree based at least in part on the message. The processing hardware derives a validator at least in part from the secret value using a sequence of entropy redistribution operations associated with the path through the key tree. The processing hardware exchanges the validator between the security chip and the first device as part of the security chip protocol in order to authenticate at least one of the security chip or the first device.

17 Claims, 14 Drawing Sheets

Verifiable leak-resistant encryption using ciphertext hash chaining

Related U.S. Application Data continuation of application No. 15/395,809, filed on Dec. 30, 2016, now Pat. No. 10,262,141, which is a continuation of application No. 14/617,437, filed on Feb. 9, 2015, now Pat. No. 9,569,623, which is a continuation of application No. 14/201,539, filed on Mar. 7, 2014, now Pat. No. 8,977,864, which is a continuation of application No. 13/762,703, filed on Feb. 8, 2013, now Pat. No. 8,707,052, which is a continuation of application No. 12/958,570, filed on Dec. 2, 2010, now Pat. No. 8,386,800.

(60) Provisional application No. 61/266,948, filed on Dec. 4, 2009.

(51) Int. Cl.

| | | |
|---|---|---|
| *H04L 9/08* | (2006.01) | |
| *H04L 9/32* | (2006.01) | |
| *G06F 21/55* | (2013.01) | |
| *H04L 9/00* | (2022.01) | |
| *G06F 12/14* | (2006.01) | |
| *H04L 9/06* | (2006.01) | |
| *H04L 9/16* | (2006.01) | |
| *G06F 9/445* | (2018.01) | |
| *G06F 21/76* | (2013.01) | |
| *G06F 8/71* | (2018.01) | |
| *H04L 9/40* | (2022.01) | |
| *G06F 21/75* | (2013.01) | |

(52) U.S. Cl.
CPC ........ *G06F 12/1408* (2013.01); *G06F 21/556* (2013.01); *G06F 21/602* (2013.01); *G06F 21/76* (2013.01); *H04L 9/003* (2013.01); *H04L 9/0631* (2013.01); *H04L 9/085* (2013.01); *H04L 9/088* (2013.01); *H04L 9/0861* (2013.01); *H04L 9/0894* (2013.01); *H04L 9/16* (2013.01); *H04L 9/3236* (2013.01); *H04L 9/3247* (2013.01); *H04L 9/3271* (2013.01); *G06F 21/755* (2017.08); *G06F 2212/402* (2013.01); *G06F 2221/034* (2013.01); *G06F 2221/2107* (2013.01); *G06F 2221/2125* (2013.01); *G06F 2221/2145* (2013.01); *H04L 9/50* (2022.05); *H04L 63/0428* (2013.01); *H04L 63/0869* (2013.01); *H04L 2209/24* (2013.01); *H04L 2209/56* (2013.01); *H04L 2463/061* (2013.01)

(58) Field of Classification Search
CPC ...... G06F 21/602; G06F 21/76; G06F 21/755; G06F 2212/402; G06F 2221/034; G06F 2221/2107; G06F 2221/2125; G06F 2221/2145; H04L 9/003; H04L 9/0631; H04L 9/085; H04L 9/0861; H04L 9/088; H04L 9/0894; H04L 9/16; H04L 9/3236; H04L 9/3247; H04L 9/3271; H04L 9/50; H04L 63/0428; H04L 63/0869; H04L 2209/24; H04L 2209/56; H04L 2463/061
See application file for complete search history.

(56) References Cited

U.S. PATENT DOCUMENTS

| | | | |
|---|---|---|---|
| 4,972,472 A | 11/1990 | Brown et al. | |
| 5,017,766 A | 5/1991 | Tamada et al. | |
| 5,179,951 A | 1/1993 | Knudson | |
| 5,268,962 A | 12/1993 | Abadi et al. | |
| 5,297,207 A | 3/1994 | Degele | |
| 5,319,172 A | 6/1994 | Komatsu | |
| 5,454,037 A | 9/1995 | Pacella | |
| 5,491,749 A | 2/1996 | Rogaway | |
| 5,511,123 A | 4/1996 | Adams | |
| 5,513,261 A | 4/1996 | Maher | |
| 5,944,833 A | 8/1999 | Ugon | |
| 5,978,475 A * | 11/1999 | Schneier | G06F 21/6209 713/177 |
| 5,991,415 A * | 11/1999 | Shamir | H04L 9/004 713/172 |
| 6,009,177 A | 12/1999 | Sudia | |
| 6,049,878 A | 4/2000 | Caronni et al. | |
| 6,188,987 B1 | 2/2001 | Fielder | |
| 6,278,783 B1 | 8/2001 | Kocher et al. | |
| 6,289,455 B1 | 9/2001 | Kocher et al. | |
| 6,298,442 B1 | 10/2001 | Kocher et al. | |
| 6,304,658 B1 | 10/2001 | Kocher et al. | |
| 6,327,661 B1 | 12/2001 | Kocher et al. | |
| 6,385,727 B1 | 5/2002 | Cassagnol et al. | |
| 6,510,518 B1 | 1/2003 | Jaffe et al. | |
| 6,539,092 B1 * | 3/2003 | Kocher | G06Q 20/40975 380/252 |
| 6,587,563 B1 | 7/2003 | Crandall | |
| 6,640,305 B2 | 10/2003 | Kocher et al. | |
| 6,654,884 B2 | 11/2003 | Jaffe et al. | |
| 6,654,889 B1 | 11/2003 | Trimberger | |
| 6,704,871 B1 * | 3/2004 | Kaplan | G06F 21/74 713/192 |
| 6,724,894 B1 | 4/2004 | Singer | |
| 6,735,313 B1 * | 5/2004 | Bleichenbacher | H04N 21/4623 348/E7.056 |
| 6,901,509 B1 * | 5/2005 | Kocher | H04L 9/3268 713/176 |
| 6,917,685 B1 | 7/2005 | Watanabe et al. | |
| 6,931,543 B1 | 8/2005 | Pang et al. | |
| 6,993,138 B1 * | 1/2006 | Hardjono | H04L 9/0836 380/278 |
| 6,996,724 B2 | 2/2006 | Murakami et al. | |
| 7,028,191 B2 | 4/2006 | Michener et al. | |
| 7,039,803 B2 | 5/2006 | Lotspiech et al. | |
| 7,117,373 B1 | 10/2006 | Trimberger et al. | |
| 7,146,501 B2 | 12/2006 | Tanaka | |
| 7,225,339 B2 * | 5/2007 | Asano | G11B 20/00507 713/193 |
| 7,299,358 B2 * | 11/2007 | Chateau | G06F 21/575 713/193 |
| 7,330,969 B2 | 2/2008 | Harrison et al. | |
| 7,333,616 B1 | 2/2008 | Brettle et al. | |
| 7,339,400 B1 | 3/2008 | Walstrum, Jr. et al. | |
| 7,373,506 B2 | 5/2008 | Asano et al. | |
| 7,373,668 B1 | 5/2008 | Trimberger | |
| 7,424,612 B2 | 9/2008 | England et al. | |
| 7,434,046 B1 | 10/2008 | Srivastava | |
| 7,539,313 B1 * | 5/2009 | Hardjono | H04L 9/0836 380/278 |
| 7,545,931 B2 | 6/2009 | Dillaway | |
| 7,550,324 B1 | 6/2009 | Walstrum, Jr. et al. | |
| 7,581,094 B1 | 8/2009 | Apostolopoulos et al. | |
| 7,587,044 B2 | 9/2009 | Kocher et al. | |
| 7,599,488 B2 | 10/2009 | Kocher et al. | |
| 7,607,025 B1 | 10/2009 | Trimberger | |
| 7,634,083 B2 | 12/2009 | Kocher et al. | |
| 7,657,035 B2 | 2/2010 | Yato et al. | |
| 7,668,310 B2 | 2/2010 | Kocher et al. | |
| 7,689,602 B1 * | 3/2010 | Sim-Tang | G06F 11/1448 707/673 |
| 7,706,538 B1 | 4/2010 | Hughes et al. | |
| 7,783,886 B2 * | 8/2010 | Walmsley | G06F 21/78 713/176 |
| 7,787,620 B2 | 8/2010 | Kocher et al. | |
| 7,986,158 B2 | 7/2011 | Langton | |
| 8,095,800 B2 | 1/2012 | Creary et al. | |
| 8,190,895 B2 * | 5/2012 | Lauter | H04L 63/06 713/171 |
| 8,250,373 B2 * | 8/2012 | Hyser | G06F 21/575 726/16 |
| 8,261,068 B1 | 9/2012 | Raizen et al. | |
| 8,261,085 B1 | 9/2012 | Fernandez Gutierrez | |

(56) References Cited

U.S. PATENT DOCUMENTS

| | | | |
|---|---|---|---|
| 8,270,614 B2* | 9/2012 | Kim | H04L 9/0836 380/278 |
| 8,332,649 B2 | 12/2012 | Yokota et al. | |
| 8,332,653 B2* | 12/2012 | Buer | G06F 21/575 713/193 |
| 8,368,517 B2* | 2/2013 | Lu | H04L 9/3271 380/255 |
| 8,386,800 B2 | 2/2013 | Kocher et al. | |
| 8,683,212 B2* | 3/2014 | Rodgers | G06F 21/6209 713/1 |
| 8,707,052 B2 | 4/2014 | Kocher et al. | |
| 8,879,724 B2 | 11/2014 | Kocher et al. | |
| 9,552,493 B2 | 1/2017 | Uzun et al. | |
| 9,712,321 B2 | 7/2017 | Jin et al. | |
| 9,729,316 B2 | 8/2017 | Jin et al. | |
| 2001/0002486 A1* | 5/2001 | Kocher | G06Q 20/367 713/171 |
| 2001/0053220 A1 | 12/2001 | Kocher et al. | |
| 2002/0094088 A1* | 7/2002 | Okaue | G11B 20/0021 380/278 |
| 2002/0099948 A1 | 7/2002 | Kocher et al. | |
| 2002/0124178 A1 | 9/2002 | Kocher et al. | |
| 2002/0129245 A1 | 9/2002 | Cassagnol et al. | |
| 2002/0131592 A1 | 9/2002 | Hinnant | |
| 2002/0141593 A1* | 10/2002 | Kurn | H04L 9/085 380/286 |
| 2002/0150250 A1* | 10/2002 | Kitaya | H04L 9/0822 380/277 |
| 2003/0044017 A1 | 3/2003 | Briscoe | |
| 2003/0056107 A1* | 3/2003 | Cammack | G06F 21/575 713/189 |
| 2003/0076958 A1* | 4/2003 | Ishiguro | H04L 9/0822 |
| 2003/0093674 A1 | 5/2003 | Harrison et al. | |
| 2003/0093684 A1 | 5/2003 | Kaiserswerth et al. | |
| 2003/0142824 A1* | 7/2003 | Asano | G06F 21/10 380/277 |
| 2003/0142826 A1* | 7/2003 | Asano | H04L 9/0836 380/277 |
| 2003/0161474 A1* | 8/2003 | Matsuzaki | H04L 9/0836 380/277 |
| 2003/0194085 A1 | 10/2003 | Dillaway | |
| 2003/0200440 A1 | 10/2003 | England et al. | |
| 2004/0030905 A1 | 2/2004 | Chow et al. | |
| 2004/0111631 A1 | 6/2004 | Kocher et al. | |
| 2004/0139321 A1* | 7/2004 | Shaffer, II | H04L 63/126 713/170 |
| 2004/0165724 A1* | 8/2004 | Choi | H04N 7/163 380/45 |
| 2004/0236720 A1* | 11/2004 | Basso | H04L 45/74591 |
| 2005/0010778 A1* | 1/2005 | Walmsley | H04L 9/3242 713/176 |
| 2005/0025316 A1 | 2/2005 | Pelly et al. | |
| 2005/0027999 A1 | 2/2005 | Pelly et al. | |
| 2005/0028192 A1 | 2/2005 | Hooper et al. | |
| 2005/0038999 A1 | 2/2005 | Pelly | |
| 2005/0044045 A1 | 2/2005 | Pelly et al. | |
| 2005/0058291 A1* | 3/2005 | Candelore | H04N 21/4334 375/E7.009 |
| 2005/0102507 A1* | 5/2005 | Sozzani | H04L 63/0853 713/165 |
| 2005/0108507 A1 | 5/2005 | Chheda et al. | |
| 2005/0180573 A1 | 8/2005 | Pelly et al. | |
| 2005/0210014 A1* | 9/2005 | Asano | G11B 20/00086 |
| 2005/0210179 A1* | 9/2005 | Walmsley | G06F 21/445 711/3 |
| 2005/0213751 A1* | 9/2005 | Apostolopoulos | H04L 9/3242 380/28 |
| 2005/0234951 A1* | 10/2005 | MacCormick | G06F 16/13 |
| 2005/0246533 A1* | 11/2005 | Gentry | H04L 9/0836 713/170 |
| 2005/0256910 A1* | 11/2005 | Kim | G06F 21/10 |
| 2005/0289067 A1* | 12/2005 | Lampson | H04L 63/0442 705/51 |
| 2006/0021066 A1* | 1/2006 | Clayton | H04L 9/0822 726/28 |
| 2006/0036627 A1* | 2/2006 | Deran | G06F 16/2246 |
| 2006/0059344 A1* | 3/2006 | Mononen | H04L 9/0891 713/171 |
| 2006/0090081 A1 | 4/2006 | Baentsch et al. | |
| 2006/0095379 A1* | 5/2006 | Kim | H04L 63/065 705/51 |
| 2006/0117177 A1* | 6/2006 | Buer | H04L 9/0897 713/155 |
| 2006/0184807 A1 | 8/2006 | Kocher et al. | |
| 2006/0242064 A1* | 10/2006 | Jogand-Coulomb | G06F 21/6218 705/50 |
| 2006/0242067 A1* | 10/2006 | Jogand-Coulomb | G06F 21/78 705/50 |
| 2006/0294018 A1 | 12/2006 | Tuoriniemi | |
| 2007/0113079 A1* | 5/2007 | Ito | G06F 9/468 713/166 |
| 2007/0133806 A1* | 6/2007 | Asano | H04L 9/0891 380/277 |
| 2007/0198851 A1* | 8/2007 | Goto | G06F 12/145 713/168 |
| 2007/0223696 A1* | 9/2007 | Furuyama | G07F 7/1008 380/239 |
| 2007/0263875 A1* | 11/2007 | Kitaya | H04L 9/0836 380/279 |
| 2007/0294496 A1* | 12/2007 | Goss | H04W 12/102 711/163 |
| 2007/0297613 A1* | 12/2007 | Ghosh | H04L 63/065 380/277 |
| 2007/0300207 A1* | 12/2007 | Booth | G06F 21/575 717/124 |
| 2008/0010686 A1* | 1/2008 | Nemoto | G06F 12/1491 380/255 |
| 2008/0013724 A1* | 1/2008 | Shamoon | H04N 21/2541 380/201 |
| 2008/0013733 A1* | 1/2008 | Johansson | H04L 9/007 380/278 |
| 2008/0022146 A1 | 1/2008 | Kocher et al. | |
| 2008/0042804 A1* | 2/2008 | Burbridge | G06K 17/0022 340/10.1 |
| 2008/0075291 A1* | 3/2008 | Kamijoh | H04L 9/0836 380/279 |
| 2008/0085003 A1 | 4/2008 | Waisbard | |
| 2008/0086636 A1* | 4/2008 | Jung | H04L 9/0836 713/163 |
| 2008/0172562 A1* | 7/2008 | Cachin | H04L 9/0637 711/E12.098 |
| 2008/0205654 A1* | 8/2008 | Moos | G06F 21/606 380/279 |
| 2008/0222427 A1 | 9/2008 | Baentsch et al. | |
| 2008/0263363 A1 | 10/2008 | Jueneman et al. | |
| 2008/0279376 A1 | 11/2008 | Jin et al. | |
| 2009/0022323 A1* | 1/2009 | Lee | H04L 9/0836 380/279 |
| 2009/0048953 A1 | 2/2009 | Hazel et al. | |
| 2009/0070583 A1 | 3/2009 | von Mueller et al. | |
| 2009/0138710 A1* | 5/2009 | Minematsu | H04L 9/0631 713/170 |
| 2009/0138728 A1* | 5/2009 | Fujiwara | G06F 21/123 713/193 |
| 2009/0187762 A1* | 7/2009 | Okamoto | H04N 21/4627 713/157 |
| 2009/0187766 A1 | 7/2009 | Vuillaume et al. | |
| 2009/0204806 A1* | 8/2009 | Kanemura | G06F 21/445 713/155 |
| 2009/0214029 A1 | 8/2009 | Jin et al. | |
| 2009/0214031 A1 | 8/2009 | Jin et al. | |
| 2009/0252324 A1 | 10/2009 | Seleznev et al. | |
| 2009/0299989 A1* | 12/2009 | Zhang | G06F 16/24545 707/999.005 |
| 2009/0304185 A1* | 12/2009 | Ju | H04L 9/0836 707/E17.014 |
| 2009/0319802 A1* | 12/2009 | Walmsley | H04L 9/3247 713/189 |

(56) References Cited

U.S. PATENT DOCUMENTS

| | | | |
|---|---|---|---|
| 2009/0327741 A1 | 12/2009 | Zimmer et al. | |
| 2010/0042842 A1* | 2/2010 | Huang | H04L 9/3247 380/46 |
| 2010/0045442 A1* | 2/2010 | Lu | H04L 9/3271 713/168 |
| 2010/0082991 A1* | 4/2010 | Baldwin | H04L 9/083 380/278 |
| 2010/0104094 A1* | 4/2010 | Takashima | H04L 9/3073 380/28 |
| 2010/0122088 A1 | 5/2010 | Oxford | |
| 2010/0125739 A1 | 5/2010 | Creary et al. | |
| 2010/0161999 A1* | 6/2010 | Poovendran | H04L 9/3236 713/189 |
| 2010/0169657 A1* | 7/2010 | Ghouti | H04L 9/0643 713/181 |
| 2010/0169658 A1* | 7/2010 | Ghouti | H04L 9/0643 713/181 |
| 2010/0183150 A1* | 7/2010 | Lee | H04L 9/0822 380/278 |
| 2010/0211787 A1* | 8/2010 | Bukshpun | H04L 9/14 380/255 |
| 2010/0278338 A1 | 11/2010 | Chang et al. | |
| 2010/0281273 A1* | 11/2010 | Lee | G06F 21/72 713/193 |
| 2011/0038481 A1 | 2/2011 | Modave et al. | |
| 2011/0072266 A1* | 3/2011 | Takayama | H04L 9/3263 713/168 |
| 2011/0078457 A1* | 3/2011 | Starr | H04L 9/0897 713/189 |
| 2011/0083019 A1* | 4/2011 | Leppard | H04L 9/002 713/189 |
| 2011/0258459 A1 | 10/2011 | Guilley et al. | |
| 2011/0286596 A1* | 11/2011 | Gressel | H04L 9/3236 380/268 |
| 2012/0102336 A1 | 4/2012 | Chheda et al. | |
| 2012/0115455 A1* | 5/2012 | Rao | H04W 12/06 455/418 |
| 2012/0166773 A1* | 6/2012 | Alekseev | H04L 9/0643 712/E9.017 |
| 2012/0198514 A1 | 8/2012 | McCune et al. | |
| 2012/0260324 A1* | 10/2012 | Lenon | G06Q 20/385 726/6 |
| 2013/0124868 A1* | 5/2013 | Sorotokin | H04L 63/10 713/176 |
| 2013/0326236 A1 | 12/2013 | Chheda et al. | |
| 2014/0129815 A9 | 5/2014 | Shah et al. | |
| 2016/0224799 A1 | 8/2016 | Uzun et al. | |

FOREIGN PATENT DOCUMENTS

| | | |
|---|---|---|
| JP | 2003-022007 A | 1/2003 |
| JP | 2004-096754 A | 3/2004 |
| JP | 2009-081549 A | 4/2009 |
| JP | 2009-175544 | 8/2009 |
| KR | 20080096054 A | 10/2008 |
| WO | WO-00-02342 A2 | 1/2000 |
| WO | WO-2007-084758 A2 | 7/2007 |
| WO | WO-2011-068996 A1 | 6/2011 |

OTHER PUBLICATIONS

Beye, Michael et al., "Improved Anonymity for Key-trees*", International Association for Cryptologic Research, vol. 20110728:025555, Jul. 22, 2011 (Jul. 22, 2011), pp. 1-16, XP061005092, [retrieved on Jul. 22, 2011]. 16 Pages.
CN Office Action dated Apr. 22, 2015 in CN Application No. 201080060319.3, Includes English Translation. 10 pages.
Dziembowski et al., "Leakage-Resilient Cryptography in the Standard Model," FOCS, pp. 293-302, IEEE Computer Society, May 28, 2008. 13 pages.
EP—Extended European Search Report dated Dec. 4, 2015 re EP Appln. No. 10835139.6. 10 Pages.
EP Communication Pursuant to Article 94(3) EPC dated May 9, 2018 re: EP Appln. No. 10835139.6. 6 Pages.
EP Communication Pursuant to Article 94(3) EPC dated Jun. 8, 2020 re: EP Appln. No. 19164962.3. 7 pages.
EP Extended European Search Report dated Jul. 5, 2019 re: EP Appln. No. 19164962.3. 8 Pages.
EP Response filed on Jun. 10, 2016 with EP Appln. No. 10835139.6 in Response to the Extended European Search Report dated Dec. 4, 2015 and the Communication Pursuant to Rules 70(2) and 70a(2) EPC dated Dec. 22, 2015. 32 Pages.
Faust et al., "Leakage-Resilient Signatures," TCC, vol. 5978 of Lecture Notes in Computer Science, pp. 343-360, 2010. 21 pages.
Hu, Lingxuan et al., "Secure Aggregation for Wireless Networks", Applications and the Internet Workshops, 2003. Proceedings 2003 Symposium. pp. 384-391. Jan. 27-31, 2003. 8 Pages.
JP Decision of Rejection dated Nov. 28, 2013 in JP Application No. 2012-542196, Includes English Translation. 9 pages.
JP Office Action dated May 17, 2013 in JP Application No. 2012-542196, Includes English Translation. 15 pages.
Katz, Jonathan (2004) , "Binary Tree Encryption: Constructions and Applications", In: Lim JI., Lee DH. (eds) Information Security and Cryptology—ICISC 2003. ICISC 2003. Lecture Notes in Computer Science, vol. 2971. Springer, Berlin, Heidelberg. 11 Pages.
Kocher et al., "Differential Power Analysis," Advances in Cryptology—Crypto 99 Proceedings, Lecture Notes in Computer Science, vol. 1666, Springer-Verlag, 1999, pp. 388-397. 10 pages.
Kondratieva, Veronika et al., "Optimized Hash Tree for Authentication in Sensor Networks", IEEE Communications Letters, vol. 11, No. 2, Feb. 2007, pp. 149-151. 3 Pages.
KR Office Action dated Sep. 5, 2016 Re: KR Appln. No. 2012-7014536. 13 Pages. (With Translation).
Lorentz Center, "Workshop on Provable Security Against Physical Attacks," Feb. 15-19, 2010, found at http://www.lorentzcenter.nl/lc/web/2010/383/presentations/index.php3?wsid=383&type=presentations. 1 page.
McEvoy et al., "All-or-NothingTransforms as a Countermeasure to Differential Side-Channel Analysis," Cryptology ePrint Archive, Report 2009/185, http://eprint.iacr.org/2009/185. 18 pages.
Menezes et al., "Handbook of Applied Cryptography," pp. 71, 586, 636-637, CRC Press, Boca Raton, Florida, 1997. 6 pages.
Menezes et al., "Efficient Implementation," Handbook of Applied Cryptography, CRC Press, Chapter 14, pp. 591-634, 1996. 44 pages.
Menezes et al., "Handbook of Applied Cryptography," Chapters 1, 5, and 7, CRC Press, Boca Raton, Florida, 1997. 130 pages.
Menezes et al., "Handbook of Applied Cryptography," CRC Press, 1996, pp. 285-298, 312-319, 452-462, 475, and 515-524, found at http://www.cacr.math.uwaterloo.ca/hac/ on Jun. 22, 2011. 45 pages.
Molnar, David et al., "Privacy and Security in Library RFID Issues, Practices, and Architectures", Proceedings of the 11th ACM Conference on Computer and Communications Security : Washington, DC, USA, Oct. 25-29, 2004; [ACM Conference on Computer and Communications Security], New York, NY : ACM Press, 2 Penn Plaza, Suite 01 New York NY 10121, Oct. 25, 2004 (Oct. 25, 2004), pp. 210-219, XP058347820, DOI: 11.1145/1030083.1030112, ISBN: 978-1-58113-961-7. 10 Pages.
Office Action dated Dec. 10, 2015, re Application No. 219,906. 12 Pages. (With Translation).
PCT International Preliminary Report on Patentability dated Jun. 14, 2012 in International Application No. PCT/US2010/058768. 12 pages.
Petit et al., "A Block Cipher Based PRNG Secure Against Side-Channel Key Recovery," Proceedings of ASIACCS 2008, pp. 56-65, Tokyo, Japan, Mar. 2008. 22 pages.
Pietrzak, K., "A Leakage-Resilient Mode of Operation," Eurocrypt 2009, Lecture Notes in Computer Science, vol. 5479, pp. 462-482, Cologne, Germany, Apr. 2009. 20 pages.
Pietrzak, K., "Provable Security for Physical Cryptography," Invited Talk, Paper, Proceedings of WEWORC 2009, Graz, Austria, Jul. 2009. 17 pages.
Pietrzak, K., "Provable Security for Physical Cryptography," Invited Talk, Slides, Proceedings of WEWORC 2009, Graz, Austria, Jul. 2009. 126 pages.

(56) References Cited

OTHER PUBLICATIONS

Standaert et al., "Leakage Resilient Cryptography in Practice," Cryptology ePrint Archive, Report 2009/341, 2009, found at http://eprint.iacr.org/2009/341.pdf. 37 pages.
Standaert, Francois-Xavier, "How Leaky is an Extractor?," Workshop on Provable Security Against SID-Channel Attacks, Leiden, The Netherlands, Feb. 2010. 11 pages.
Su, Chien-Chung et al., "The New Intrusion Prevention and Detection Approaches for Clustering-Based Sensor Networks", Wireless Communications and Networking Conference, IEEE New Orleans, LA, USA, pp. 1927-1932, Mar. 13-17, 2005. 6 Pages.
Tanaka et al., "Study on Practical Message Authentication Mechanisms for Digital Streaming Services," IEICE Technical Report, Jul. 18, 2001, vol. 101, No. 204, Tokyo, Japan. 11 pages (no translation).
TW Office Action dated Jul. 16, 2013 in TW Application No. 99142160, Includes English Translation. 12 pages.

* cited by examiner

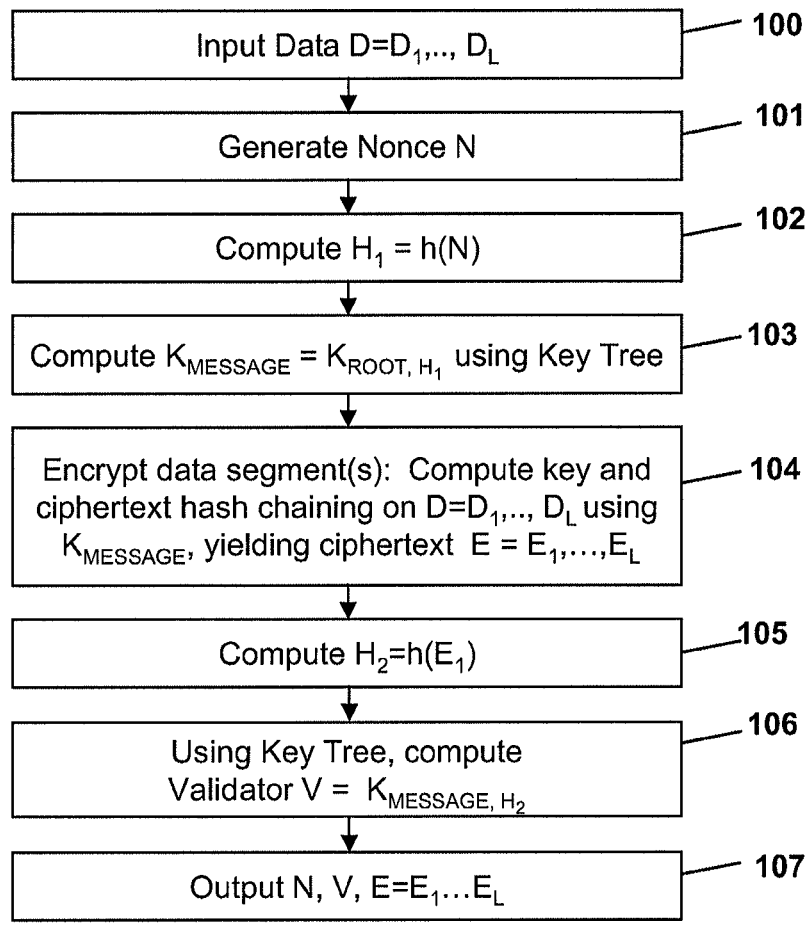
Figure 1: Verifiable leak-resistant encryption using ciphertext hash chaining

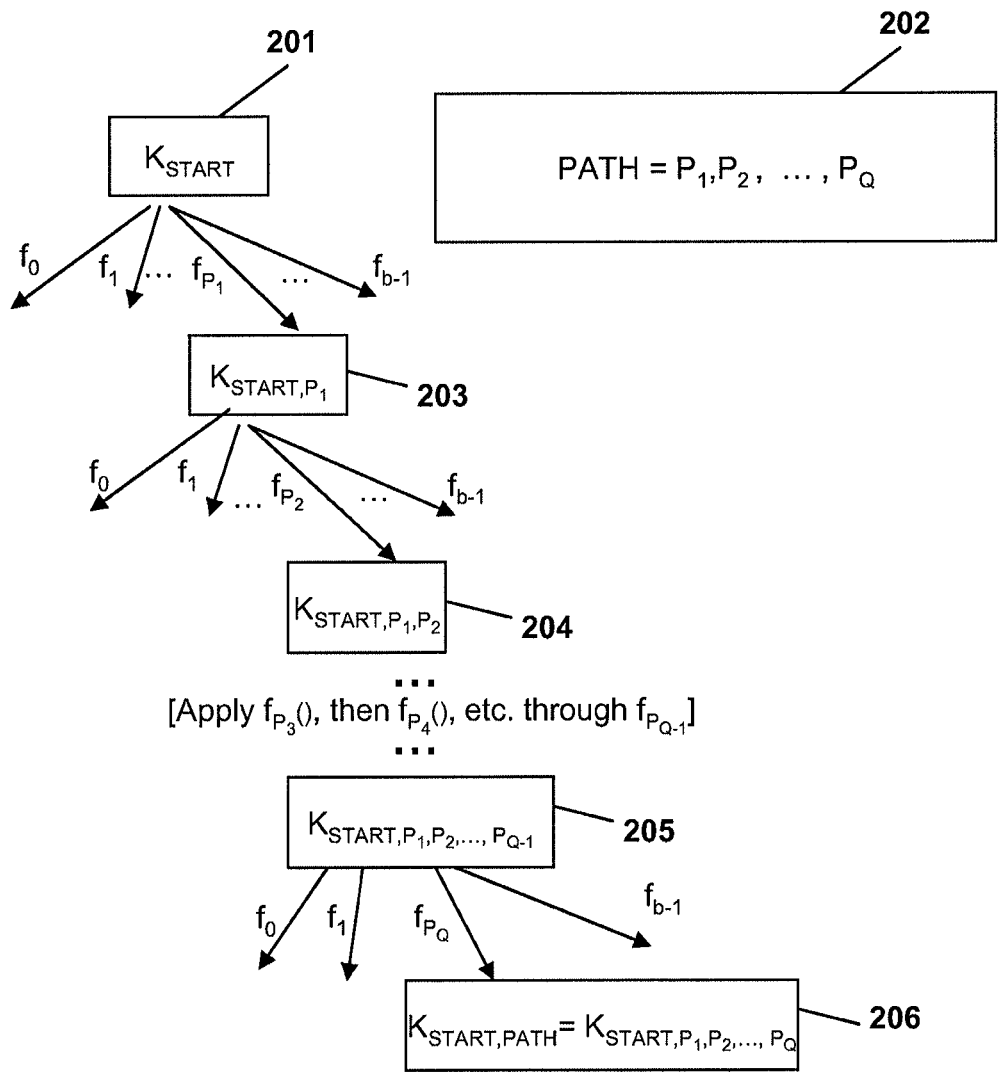
Figure 2: Leak-resistant key-tree based key derivation process from the key $K_{START}$

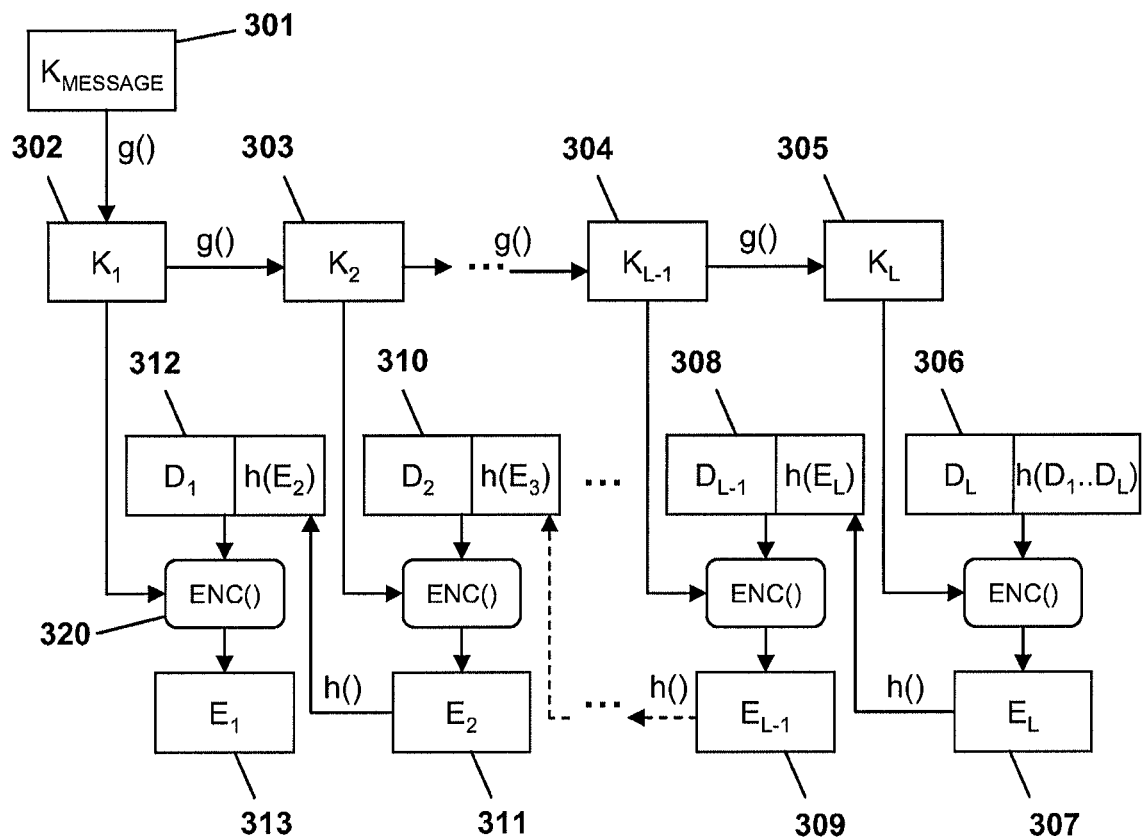
Figure 3: Leak-resistant, key and ciphertext hash chaining process for encryption

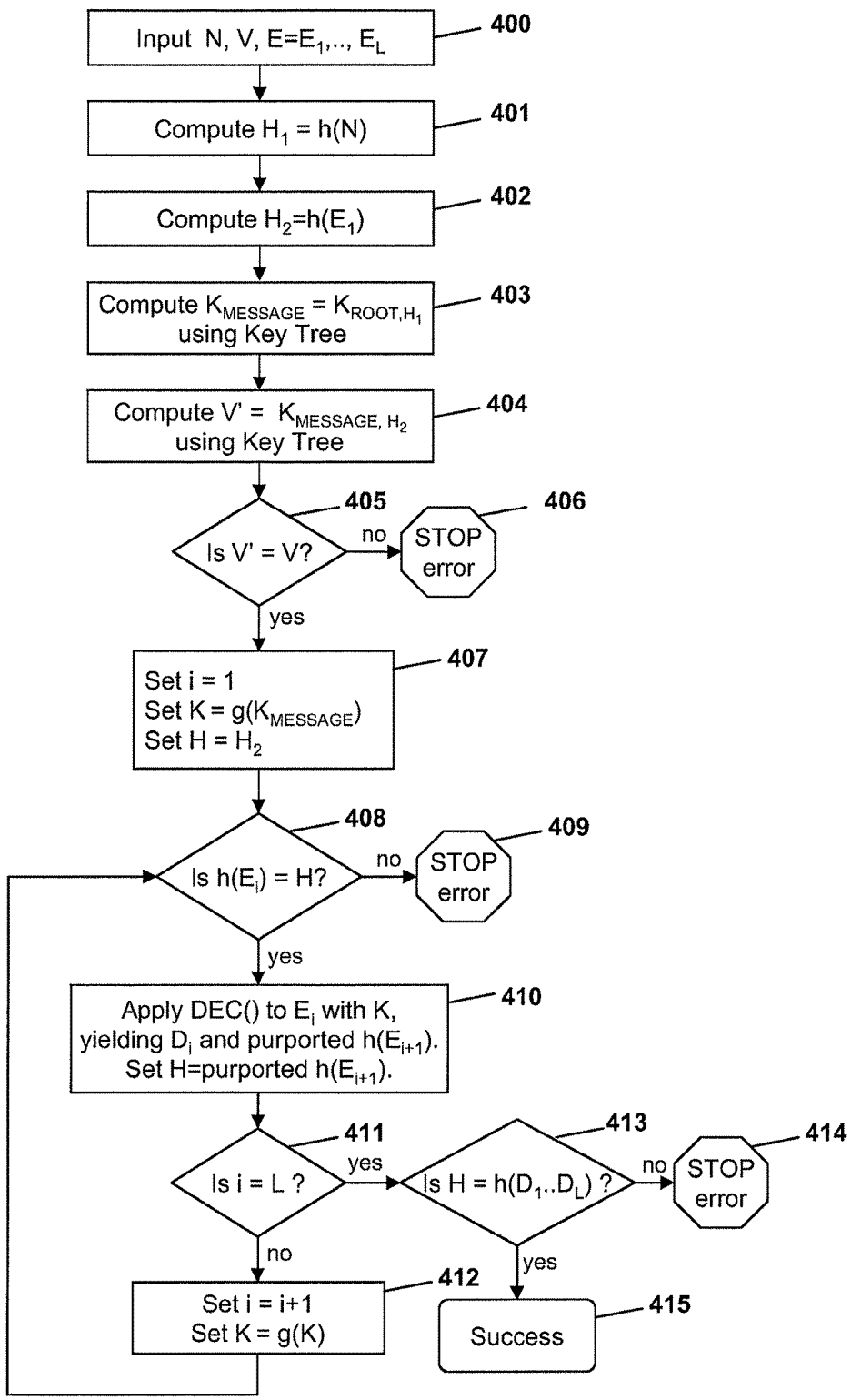
Figure 4: Verifiable leak resistant decryption using ciphertext hash chaining

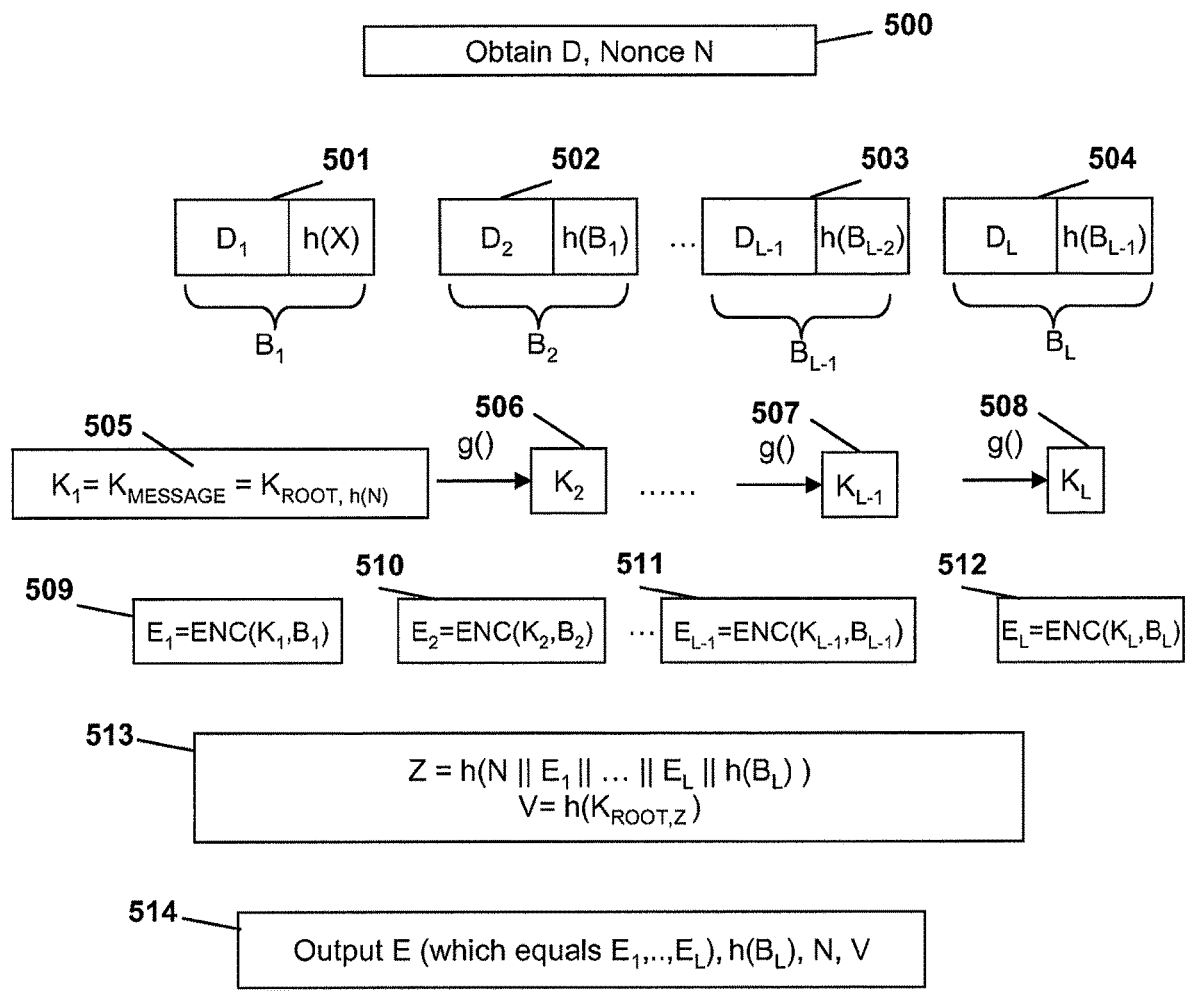
Figure 5: Verifiable leak-resistant encryption using plaintext hash chaining

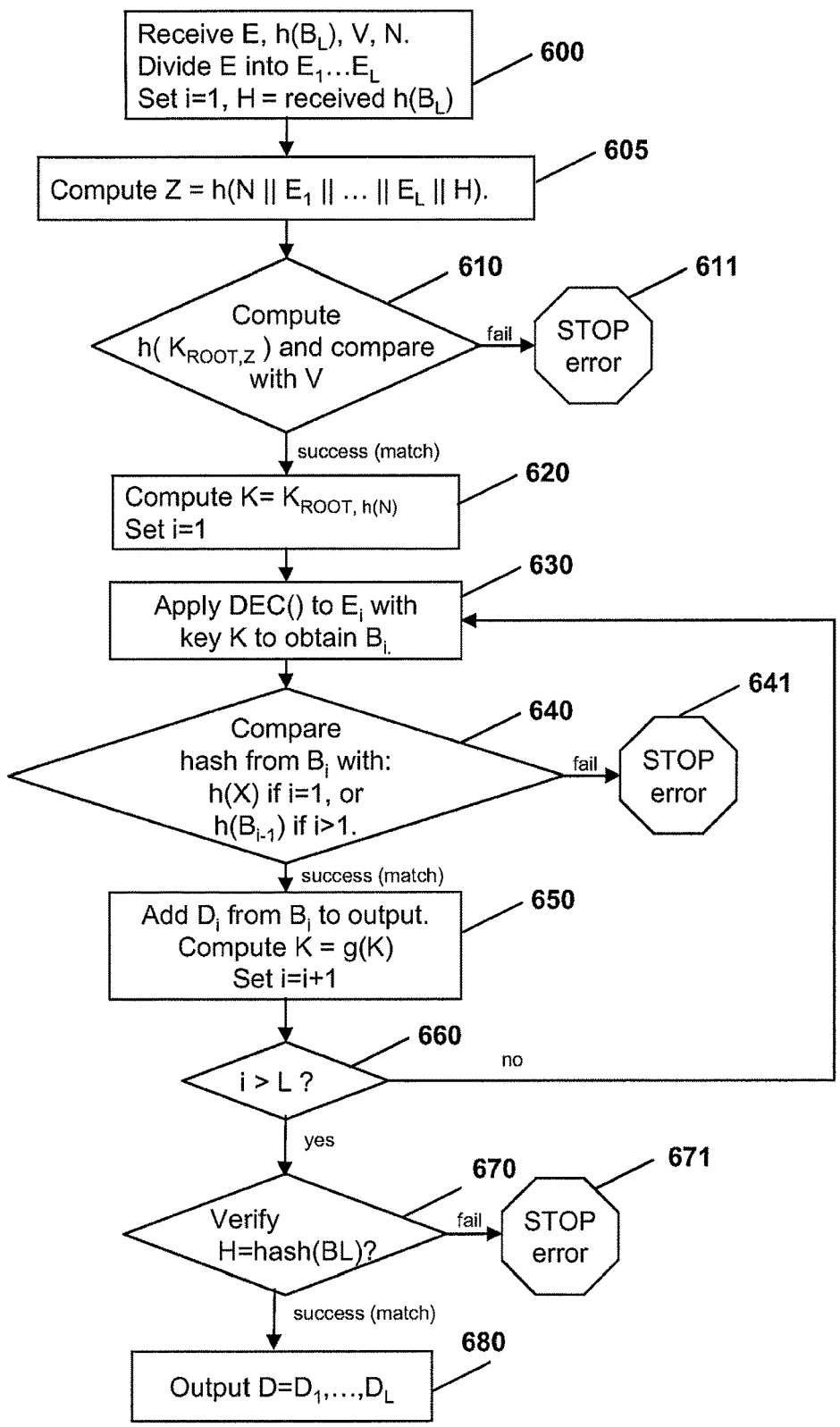
Figure 6: Verifiable leak resistant decryption using plaintext hash chaining

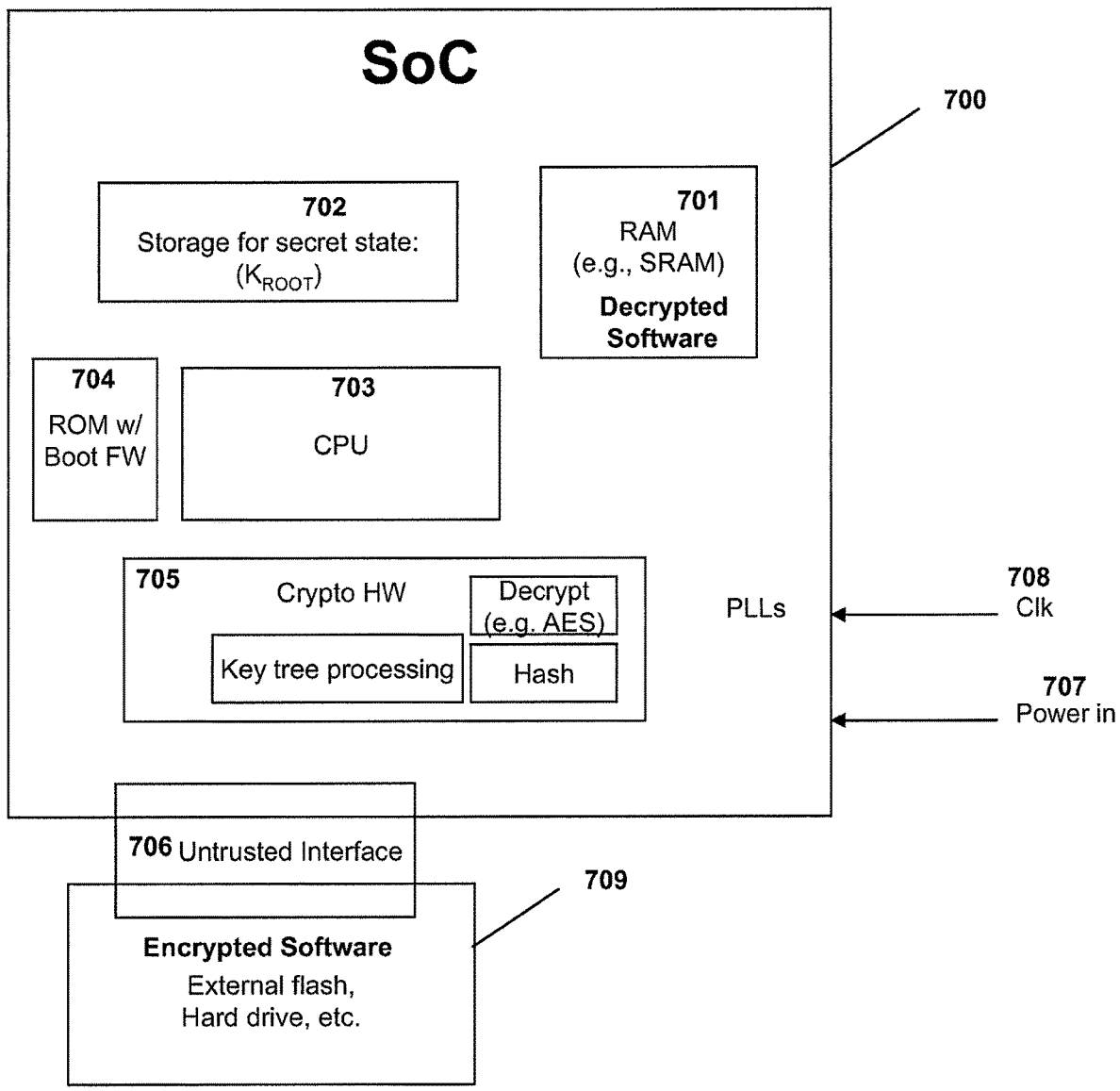
Figure 7: Firmware loading

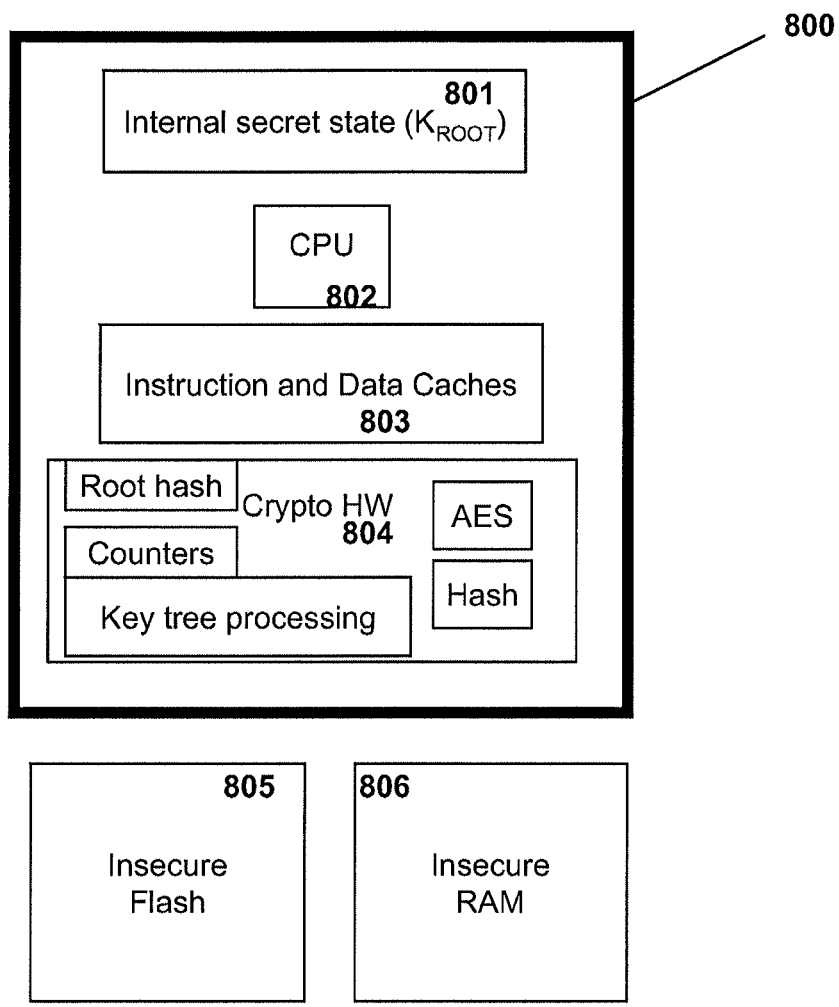
Figure 8: Secure CPU

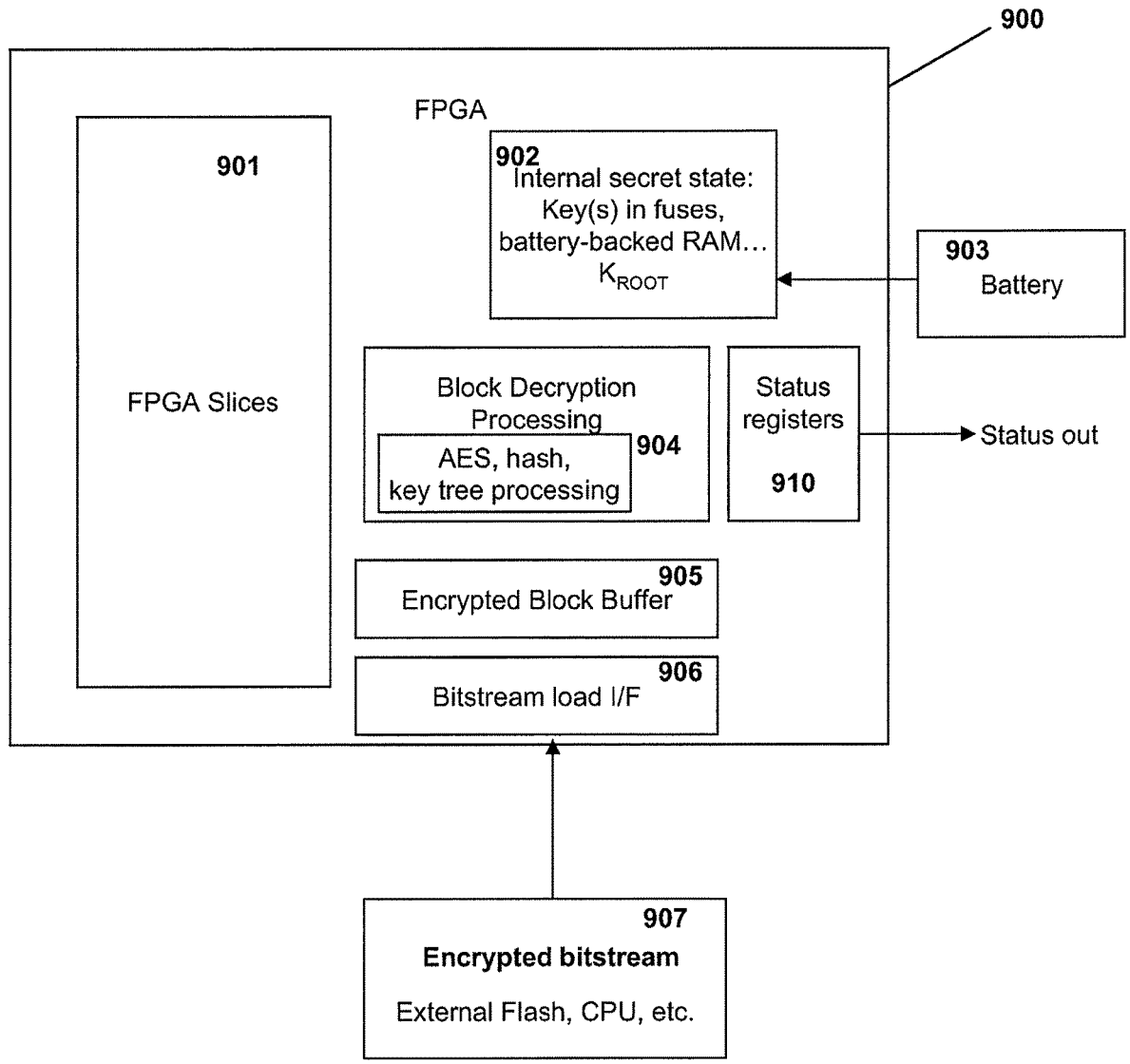
Figure 9: FPGA bitstream loading

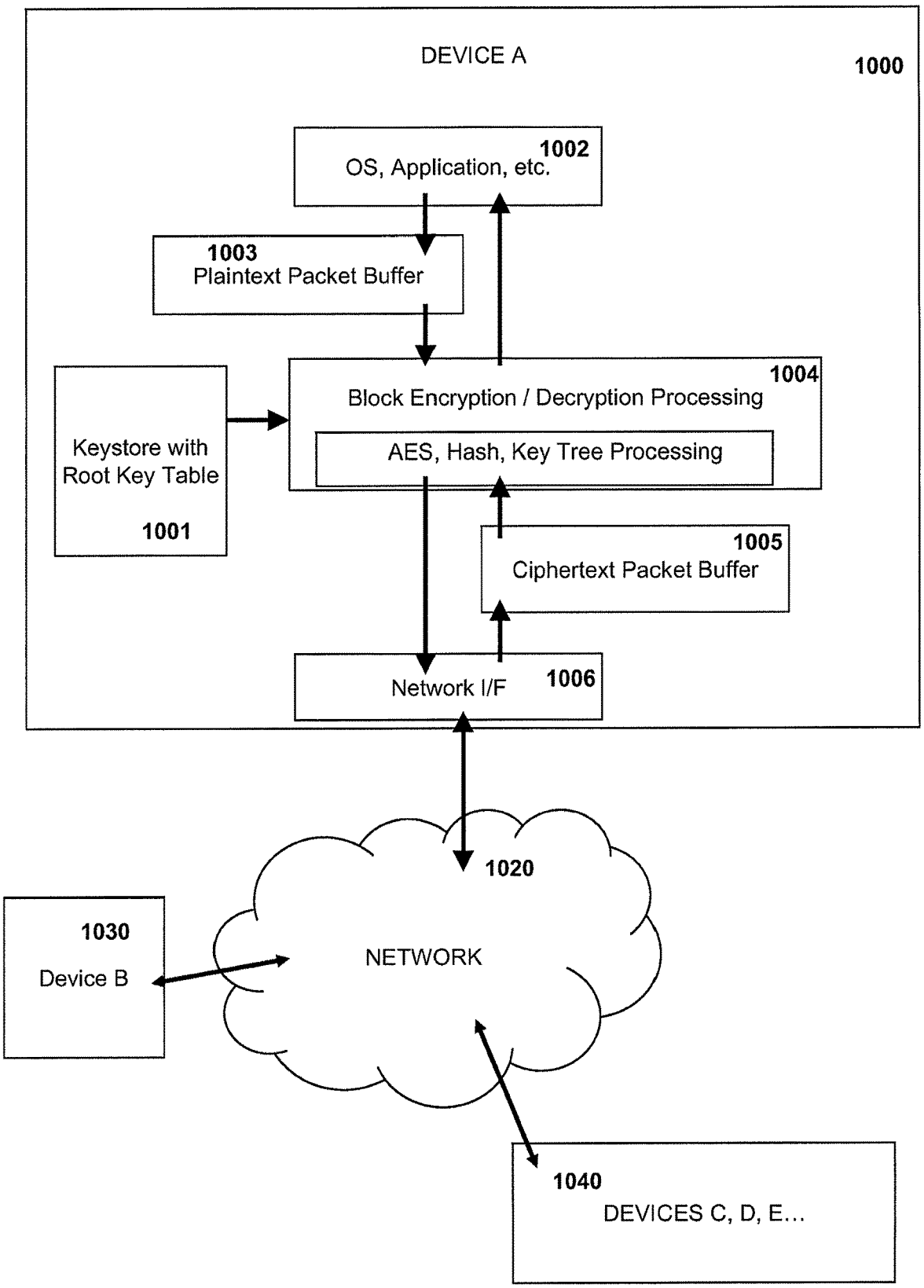
Figure 10: Network communication devices

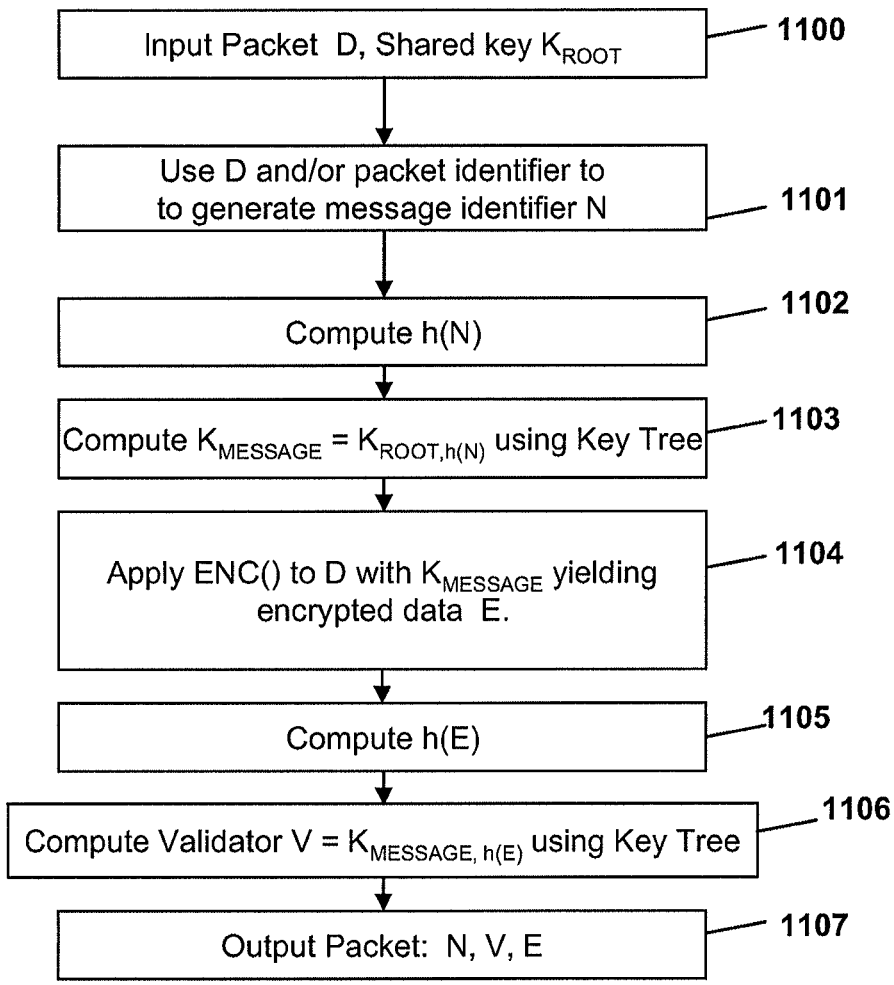
Figure 11: Verifiable packet level Leak-Resistant Encryption

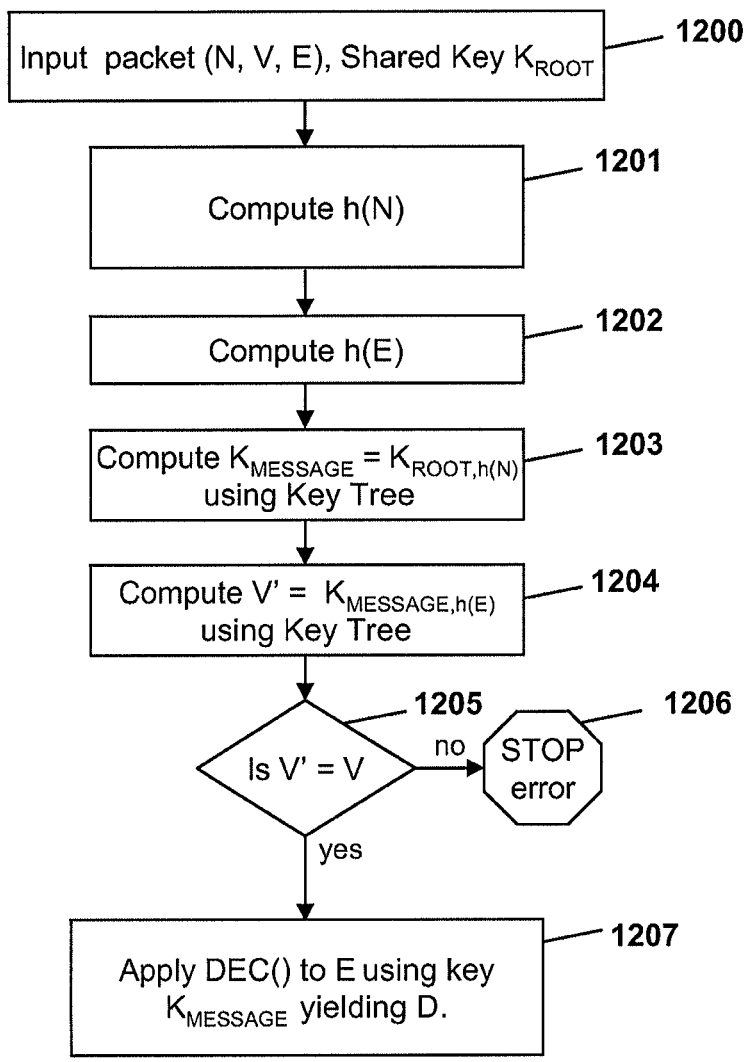
Figure 12: Verifiable packet level leak resistant decryption

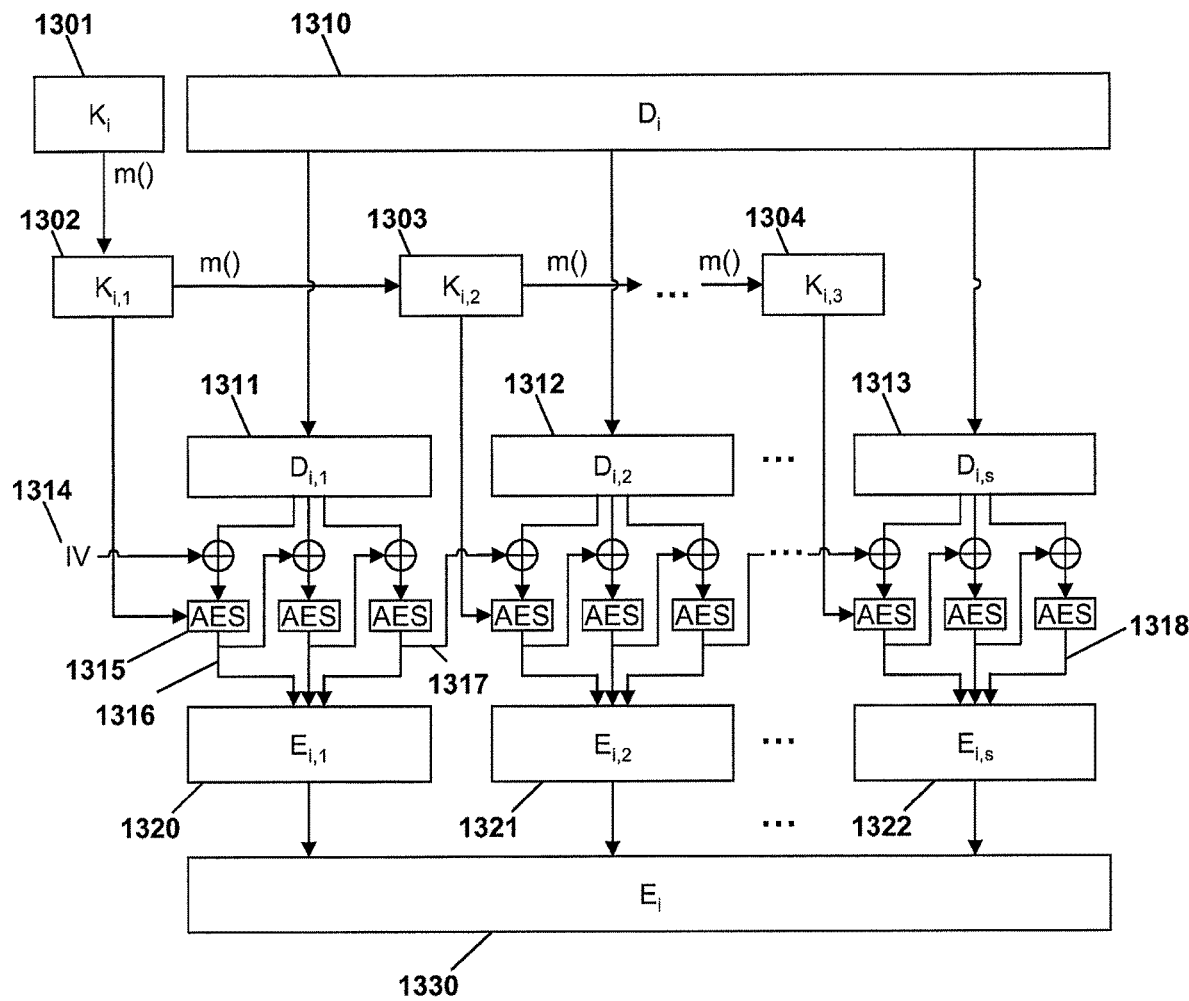
Figure 13: Exemplary ENC() CBC method with intra-segment key changes

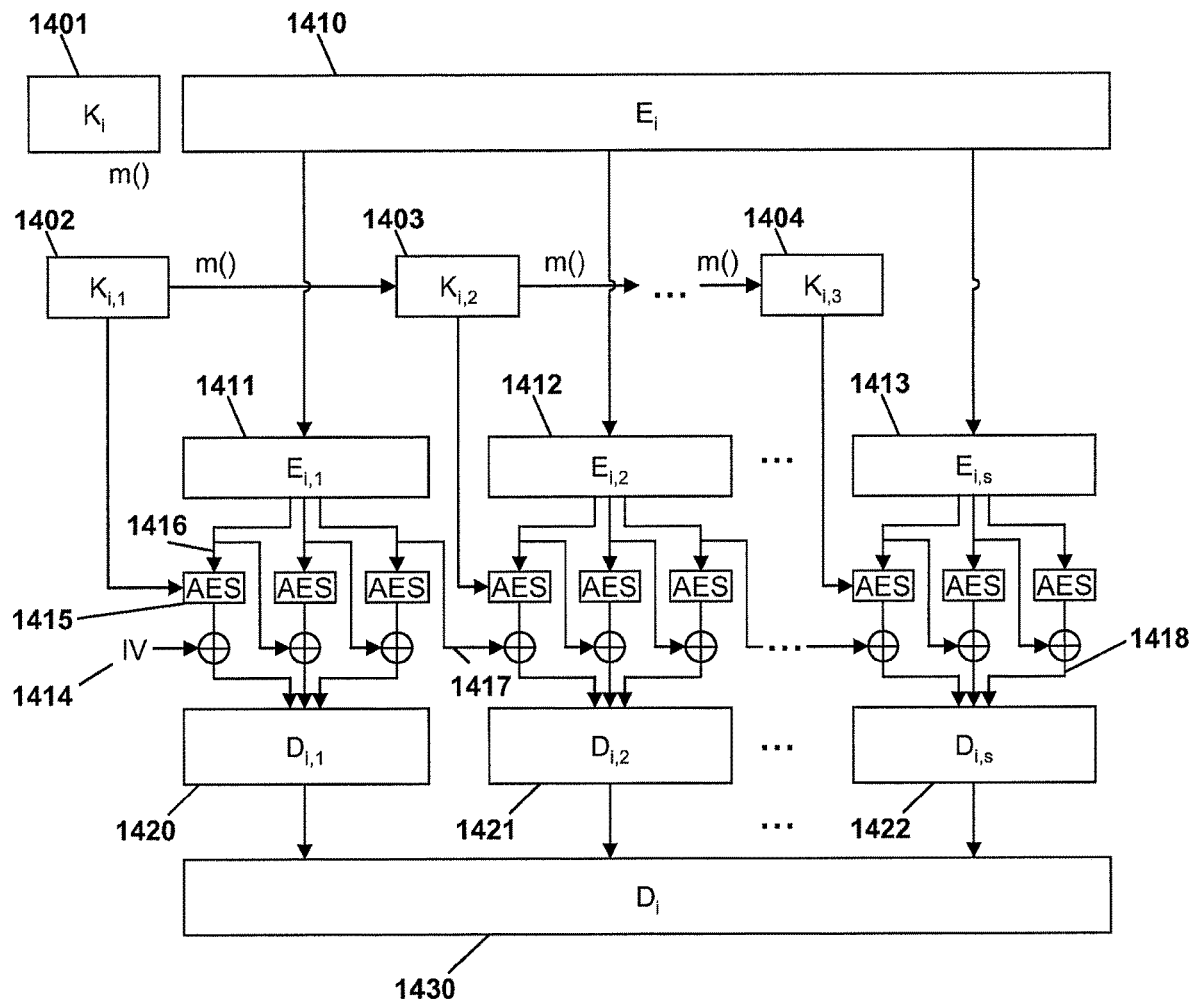
Figure 14: Exemplary DEC() CBC method with intra-segment key changes

SECURITY CHIP WITH RESISTANCE TO EXTERNAL MONITORING ATTACKS

CROSS-REFERENCE TO RELATED APPLICATIONS

This is a Continuation of pending U.S. patent application Ser. No. 16/240,671 filed Jan. 4, 2019, which is a continuation of U.S. patent application Ser. No. 15/395,809 filed Dec. 30, 2016, which issued Apr. 16, 2019 as U.S. Pat. No. 10,262,141, which is a continuation of U.S. patent application Ser. No. 14/617,437 filed Feb. 9, 2015, which issued Feb. 14, 2017 as U.S. Pat. No. 9,569,623, which is a continuation of U.S. patent application Ser. No. 14/201,539 filed Mar. 7, 2014, which issued Mar. 10, 2015 as U.S. Pat. No. 8,977,864, which is a Continuation of U.S. patent application Ser. No. 13/762,703 filed Feb. 8, 2013, which issued on Apr. 22, 2014 as U.S. Pat. No. 8,707,052, which is a continuation of U.S. patent application Ser. No. 12/958,570 filed Dec. 2, 2010, which issued on Feb. 26, 2013 as U.S. Pat. No. 8,386,800, which claims priority to U.S. Provisional Patent Application Ser. No. 61/266,948 filed Dec. 4, 2009, each of which is incorporated by reference herein in their entirety.

This application is also related to U.S. patent application Ser. No. 14/737,154 filed Jun. 11, 2015, which issued on Feb. 21, 2017 as U.S. Pat. No. 9,576,133, and to U.S. patent application Ser. No. 14/752,677 filed Jun. 26, 2015, which issued on Jun. 14, 2016 as U.S. Pat. No. 9,367,693, and to U.S. patent application Ser. No. 15/691,601 filed Aug. 30, 2017, which issued on Apr. 10, 2018 as U.S. Pat. No. 9,940,463, each of which is incorporated by reference herein in their entirety.

FIELD

This patent relates to techniques for processing encrypted data inputs, and more specifically, to protecting such systems and data against external monitoring attacks.

BACKGROUND

Systems that operate on sensitive data need to protect against the unauthorized access to, or disclosure or alteration of, such data by attackers. Attackers who gain access to cryptographic keys and other secrets could steal or tamper with the sensitive data, leading to severe consequences such as subversion of critical operations of the system through the introduction of unauthorized commands and the exposure of confidential or proprietary information. One compromised element may also be used to mount further attacks, endangering other elements of a system. More specifically, previous research has shown that an attacker can monitor a device's external characteristics such as operation timing, power consumption and/or electromagnetic radiation and use this additional information to extract the secret keys being used within the device. For example, as described by Kocher et al (see P. Kocher, J. Jaffe, B. Jun, "Differential Power Analysis," Advances in Cryptology—Crypto 99 Proceedings, Lecture Notes In Computer Science Vol. 1666, Springer-Verlag, 1999), it is well known in the art that external monitoring of a device performing a sequence of cryptographic operations using the same set of keys with different data can result in the leakage of the key.

Because external monitoring attacks are typically passive and non-invasive, traditional tamper resistance defenses which are based on thwarting physical access or detecting improper usage are insufficient or impractical to provide protection against such attacks. For example, methods for managing secret keys using physically secure, well-shielded rooms are known in the background art. However, in many applications, requiring cryptographic systems to remain in physically isolated facilities is not feasible, given the environments in which they are expected to operate. In addition, such facilities are expensive to build and operate, and may still be imperfect in their ability to prevent small amounts of information from leaking to adversaries.

Of course, other methods are known in the background art that can mitigate the problem of information leakage from monitoring attacks without necessarily relying on physical shielding. These include methods for reducing the amount (or rate) of information leaking from transactions, modifying cryptographic algorithm implementations to randomize computational intermediates, and/or introducing noise in power consumption and operation timing.

For example, U.S. Pat. No. 6,539,092, entitled "Leak-Resistant Cryptographic Indexed Key Update," provides methods for converting a shared master key and an index value (e.g., a counter) into a transaction key, where the derivation is protected against external monitoring attacks. Those methods work well in applications where the device(s) being protected against external monitoring attacks can contribute to the derivation of the transaction key. For example, the '092 patent describes how a smartcard can maintain an index counter which increments with each transaction, then use the index counter in the key derivation.

There are applications, however, where the participant(s) in a protocol should be protected against external monitoring attacks, but lack the ability to store sequence counters and updated keys, as described in the '092 patent. For example, consider the case where a device needs to regularly process the same input data, such as a device which contains a fixed and unchanging embedded key that is repeatedly used to decrypt ciphertexts in arbitrary order. Firmware encryption is an example of such an application; a microprocessor may be manufactured having an embedded key in fuses, and on every reboot the microprocessor needs to re-decrypt its firmware image loaded from an untrusted external flash. The firmware image may occasionally be updated, but the same ciphertext may also be decrypted repeatedly. Thus, both the application requirements and the physical manufacturing limitations (such as the inability to modify stored keys due to the use of one-time-programmable fuses to hold keys) can make it impractical for the device to limit the number of times the decryption key will be used. The firmware publisher could use the methods described in the '092 patent with a new index value each time a new encrypted firmware image is released, but the decrypting device cannot use a different index value on each reboot, since changing the index value to a value other than the one used by the encrypting device would result in an incorrect decryption. Thus, an attacker can potentially supply the decryption device with tampered data sets, then attempt to recover the secret key by monitoring external characteristics while the device processes (e.g., decrypts, etc.) these ciphertexts. Statistical side channel attacks, such as differential power analysis (DPA), can deduce a secret key from a set of measurements collected when a device uses the same key repeatedly to operate on different input values (such as the different firmware ciphertexts or tampered versions of the same firmware ciphertexts in the foregoing examples). Measurements from a single long message (e.g., comprising many block cipher inputs) or a collection of legitimate messages (such as multiple firmware versions) may also provide sufficient data for a side channel attack, even if ciphertext messages are not tampered.

Of course, in some situations where a device uses the same key for every transaction, the device could theoretically implement a lock-out (e.g., by self-destructing if a transaction or failure threshold is exceeded) to limit the number of transactions an adversary can observe. Lock-out mechanisms, however, introduce numerous practical problems, however, such as reliability concerns and the difficulties associated with storing a failure counter (e.g., many semiconductor manufacturing processes lack secure on-chip nonvolatile storage, and off-chip storage is difficult to secure).

In light of all the foregoing, a method that provides a verifiably secure way for devices to communicate and exchange data, with protection against external monitoring attacks and the ability for devices to reject non-genuine data, would be advantageous.

SUMMARY

This patent describes ways to secure devices which utilize secret cryptographic keys against external monitoring attacks, as well as to provide improved security against conventional cryptanalysis and other attacks (such as DPA and other forms of external monitoring attacks) which gather information correlated to the device's internal operations. Various exemplary embodiments for encrypting sensitive data are disclosed in the specification.

While these various embodiments may vary considerably in their details, they are all encompassed within the following general technique, as may be readily verified with respect to the various embodiments described in the specification: With respect to encryption, each set of data to be encrypted is associated with a message identifier (such as a transaction/message counter, a hash of the plaintext, a random value, or another unique or semi-unique value). The encryption device derives a message key using the message identifier and an initial secret internal state that is shared with the decryption device(s). This derivation is performed in an iterative manner through a succession of one or more intermediate keys, starting from at least a portion of the shared secret internal state and leading up to the message key, where, in each iteration, the next key depends on at least one prior key and at least a portion of the message identifier. The plaintext may be decomposed into one or more segments. Each plaintext segment is encrypted with one or more secret keys that can include the message key, or keys further derived from the message key, to create the corresponding encrypted segment. Typically, a different key (or a different set of keys) is used for each segment.

The encrypting device then uses a secret key shared with the decrypting device (such as the message key, the secret internal secret, a different key, keys derived from the foregoing, etc.) to compute at least one validator. Derivation of the validator may be performed using an iterative process similar to that used to produce the message key, whereby a sequence of transformations are applied to the secret key to produce successive values (for example, where the generation of each intermediate includes hashing its parent value).

The encrypting device outputs the one or more encrypted segments and one or more validators. Additional information may also be output as needed to enable the recipient to determine the message identifier.

During the corresponding decryption process, a decrypting device receives the one or more encrypted segments, one or more validator(s), and the message identifier corresponding to the encrypted segment(s). It then uses one or more validators to verify that at least the first encrypted segment to be decrypted has not been modified. Verification of the validator may include computing a sequence of successive intermediate values, starting with a secret shared with the encrypting device and where each intermediate is the hash of its parent (and the specific hash operation depends on a portion of the hash of said encrypted segment(s)). Typically, the decryption process for an encrypted segment is only permitted to proceed if it is verified that the segment is not modified. If verification is successful, the decrypting device computes the message key (if not already derived), using the secret internal state that it shares with the encryption devices, by following the same iterative key derivation process followed by the encrypting device (i.e., starting from at least a portion of the shared secret internal state, leading to the final message key, through a sequence of intermediate keys, where at each step the next key depends on at least a portion of the message identifier and at least one prior key). Each encrypted segment (if determined to be unmodified) is decrypted with the one or more corresponding secret keys derived from the message key to recover the corresponding plaintext segment.

BRIEF DESCRIPTION OF THE FIGURES

FIG. 1 shows an exemplary embodiment of the overall process for verifiable, leak-resistant encryption using key and ciphertext hash chaining.

FIG. 2 shows an exemplary embodiment of a leak resistant, key-tree-based key derivation process starting from a shared cryptographic secret, KSTART, and continuing through a path P1 . . . PQ. The key derivation process of FIG. 2 is usable in connection with the first exemplary encryption process of FIGS. 1 & 3 and the first exemplary decryption process of FIG. 4. It is also usable in connection with the other exemplary encryption processes of FIGS. 5, 11 & 13, and the other exemplary decryption processes of FIGS. 6, 12 & 14.

FIG. 3 shows an exemplary embodiment of a leak-resistant key and ciphertext hash chaining process for encryption (e.g., comprising part of the overall encryption process shown in FIG. 1).

FIG. 4 shows an exemplary embodiment of a verifiable, leak-resistant decryption process using key and ciphertext hash chaining corresponding to the encryption process of FIG. 1 (and FIG. 3).

FIG. 5 shows an exemplary embodiment of a process for verifiable, leak-resistant encryption using key and plaintext hash chaining.

FIG. 6 shows an exemplary embodiment of a process for verifiable, leak-resistant decryption using key and plaintext hash chaining corresponding to the encryption process of FIG. 5.

FIG. 7 shows an environment in which verifiable, leak-resistant cryptographic operations are used for loading firmware onto a system on a chip.

FIG. 8 shows an environment in which verifiable, leak-resistant cryptographic operations are used within a secure CPU chip, where external memory such as flash and/or RAM is untrusted.

FIG. 9 shows an environment in which verifiable, leak-resistant cryptographic operations are used for loading a bitstream image on to a field programmable gate array.

FIG. 10 shows an environment in which verifiable, leak-resistant cryptographic operations are used in a packet based network communication device.

FIG. 11 shows an exemplary embodiment of a process for verifiable packet-level leak-resistant encryption that can be used with the environment described in FIG. 10, as well as in other embodiments.

FIG. 12 shows an exemplary embodiment of a process for verifiable packet-level leak-resistant decryption corresponding to the encryption process described in FIG. 11.

FIG. 13 shows an exemplary embodiment of an exemplary ENC( ) operation, using cipher block chaining (CBC) with intra-segment key changes.

FIG. 14 shows an exemplary embodiment of an exemplary DEC( ) operation, using cipher block chaining (CBC) with intra-segment key changes, corresponding to the encryption operation of FIG. 13.

DETAILED DESCRIPTION

The techniques described in this patent enable parties to communicate cryptographically-protected sensitive data with increased security against external monitoring attacks. Although exemplary embodiments are described involving two parties, typically referred to as an "encrypting device" and a "decrypting device", the term "device" is chosen for convenience and need not necessarily correspond directly to any particular role in a system design. The devices may, but are not required to, utilize different form factors or implementations. For example, the encrypting and decrypting devices could both be portable hardware devices. Alternatively, the encrypting device could be a software application running on a server operating in a facility, while the decrypting device could be a portable hardware device (or vice versa). Furthermore, although most cryptographic operations involve two parties, the techniques of this patent can, of course, be applied in environments involving only one party (such as in secure memory or storage systems in which both roles are under a single party's and/or device's control, e.g., in the exemplary environment illustrated in FIG. 8) or in environments involving more than two parties and/or devices (such as the exemplary embodiment which is illustrated in FIG. 10).

Entropy Redistribution Operations

As used herein, an "entropy redistribution operation" (or "entropy distribution operation") is an operation which mixes its input(s) such that unknown information about input bits is redistributed among the output bits. For example, suppose an x bit cryptographic key $K0$ is processed repeatedly with an entropy redistribution operation f such that key $Ki=f(Ki-1)$ for each $i>1$. Next, suppose an adversary obtains y bits of information (e.g., obtained as part of an attempted external monitoring attack) about each of n different keys $Ki$, providing more than enough information to solve for key $K0$ (e.g., $y*n>x$). The use of the entropy distribution operation f can make such solution computationally infeasible. A cryptographic hash function H is an example of an operation that may be used as an entropy redistribution operation. For example, consider a strong hash function H that produces a 256-bit result. Given a random 256-bit initial key $K0$, let $Ki=H(Ki-1)$ for each $i>1$. An adversary with knowledge of (for example) the least-significant bit of each $K0$ . . . $K999,999$ has 1,000,000 bits of data related to $K0$. A hypothetical adversary with infinite computing power could find $K0$ by testing all possible $2^{256}$ values for $K0$ to identify a value which is consistent with the known sequence of least-significant bits. Actual adversaries have finite computational power available, however, and the entropy redistribution operation prevents there from being a computationally practical way to solve for $K0$ (or any other $Ki$) given the information leaked through attempted external monitoring attacks.

Entropy redistribution operations may be implemented, without limitation, using cryptographic hash functions, operations constructed using block ciphers (such as AES), pseudorandom transformations, pseudorandom permutations, other cryptographic operations, or combinations thereof. As a matter of convenience, certain exemplary embodiments are described with respect to a hash, but those skilled in the art will understand that, pursuant to the foregoing, other entropy redistribution functions may also be used instead or in addition.

Multiple entropy redistribution operations can also be constructed from a base operation. By way of example, if two 256-bit entropy redistribution operations $f0( )$ and $f1( )$ are required, $f0( )$ could comprise applying the SHA-256 cryptographic hash function to the operation identifier string "f0" concatenated with the input to $f0( )$ while $f1( )$ could comprise applying SHA-256 to the operation identifier string "f1" concatenated with the input to $f1( )$ Entropy redistribution operations can be construed using the well-known AES block cipher. For example, to implement $f0( )$ . . . $fb-1( )$, each $fi( )$ can use its input as an AES-256 key to encrypt a pair of 128-bit input blocks that are unique to the choice of i within 0 . . . b−1, yielding 256 bits of output. A wide variety of block cipher based hash function and MAC constructions are also known in the background art and may also employed.

Shared Cryptographic Values and Operations

This section describes certain cryptographic value(s) and/or operation(s) shared by both the encryption device, and its corresponding decryption device, used to perform verifiable leak-resistant cryptographic operations as described in this patent.

The encrypting device and decrypting device are set up so that each has access to a base shared secret cryptographic state value, such as a secret key denoted as KROOT. This secret state may, for example, be stored in one or more of EEPROM, flash, fuses, or other storage on a tamper-resistant chip, and may be derived in whole or in part from other values or processes, or may be obtained externally. The method by which each of these devices obtained KROOT could include, without limitation, each being manufactured with KROOT, the devices negotiating KROOT directly with each other or via third parties (e.g., using protocols utilizing RSA, Diffie-Hellman, or other public key cryptographic techniques, or symmetric techniques), by receiving of KROOT via a physical keying interface, randomly generating KROOT (e.g., if the encrypting and decrypting device are the same), etc.

In addition, the encrypting device and decrypting device also are both able to compute a set of non-linear cryptographic entropy redistribution operations $f0( ) f1( ), \ldots, fb-1( )$ where $b>1$ is a positive integer. These b entropy redistribution functions can be configured in a tree structure. For example, a simple b-ary tree structure of height Q (i.e., having Q+1 levels, from 0 through Q) can be created by using b distinct entropy distribution functions, $f0( ), \ldots fb-1( )$ to represent the b possible branches of this b-ary tree at each node of the tree, each node representing a possible derived key. In such a tree, starting from a root cryptographic key KSTART (which is at level 0), b possible derived keys can be computed at level 1: $f0(KSTART)$ for the leftmost branch; $f1(KSTART)$ for the next branch; and continuing until $fb-1(KSTART)$ for the rightmost branch. At level 2, $b^2$ possible keys can be derived, since each of f0( ) ... fb–1( ) could be applied to each of the b possible level 1 keys. Of course, computing a specific level 2 node only requires two, not b2, computations (i.e., the nodes not on the path are not computed). The tree continues for successive levels 1 through Q, where each possible key (i.e., a different node) of a prior level can be processed by applying f0( ) ... fb–1( ) in turn to derive b additional possible derived keys. The entire key tree has Q+1 levels, starting with a single node at level 0, continuing with bi nodes at level i, and ending with bQ nodes at level Q. Thus, there are bQ possible paths from the root node at level 0 to the bQ final nodes at level Q. Each such possible path, corresponding to a unique the sequence of functions applied at the different levels, can be represented as a sequence of Q integers, each integer being selected from (0 ... b–1).

For example, in an exemplary embodiment, b=2. Thus, two entropy redistribution operations, f0( ) and f1( ) are used (and may be constructed from a base operation, e.g., as described above). If Q=128 (i.e., the height is 128), 2128 paths are possible and 128 entropy redistribution function computations are required to derive the level Q key from the level 0 node (i.e., the starting key).

As a variation, embodiments can involve more variety in the choice of b, such as varying the value of b among levels, and/or varying b based on the route taken to a particular level. Likewise, the entropy redistribution operations can also be varied, such as by making the entropy redistribution operations fi( ) differ at different levels or making these operations depend on the sequence taken to a particular level.

The encrypting and decrypting devices are also able to perform a cryptographic, non-linear key chaining operation g( ), which may be (but is not necessarily) distinct from the functions fi( ). For example, in one embodiment, g( ) consists of a cryptographic hash operation. Variant embodiments can use different functions for different applications of g( ), including variants constructed from a base function (e.g., by hashing the input data with a counter or another value representing the application of g( )).

The encrypting device and decrypting device also have a cryptographic, collision-resistant, one-way hash function h( )(e.g., employed as a segment hashing function), which may be (but is not necessarily) distinct from the operations fi( ) and from g( )).

In an exemplary embodiment, each of the operations fi( ), g( ), and h( ) is constructed from a common cryptographic hash function by computing each operation as the cryptographic hash of an operation identifier and the input data. The operation identifier may, for example, be a zero-terminated string consisting of "f#", "g" or "h" where # is the value of i for a given fi( ) such that the operation identifier for f0( ) would be "f0". The HMAC of an operation identifier using the input as a key may also be used to implement these operations. Hash functions usable with the techniques of this patent include, without limitation, MD5, SHA-1, SHA-256, SHA-512, any SHA3 candidate operation, as well as combinations of the foregoing and constructions using the foregoing (such as HMAC). As used herein, each of the functions BLAKE, Blue Midnight Wish, CubeHash, ECHO, Fugue, Grøstl, Hamsi, J H, Keccak, LANE, Luffa, Shabal, SHAvite-3, SIMD, and Skein is a "SHA3 candidate operation". In other embodiments, the hash function is derived using other well known constructions such as, without limitation, Matyas-Meyer-Oseas, Davies-Meyer, Miyaguchi-Preneel, Merke-Damgard, etc., that convert block ciphers such as AES, DES or other ciphers into a hash function. Transformations that are not collision-resistant (such as MD5, reduced-round variants of hash transformations, or other mixing operations) can also redistribute entropy present in the input, but would be less attractive for use as the one-way function h( ).

Still other embodiments may utilize stream ciphers, potentially including lightweight and potentially cryptographically weak stream ciphers, in implementing entropy redistribution operations f0 ... b–1( ). For example, the stream cipher RC4 may be employed, where the entropy redistribution operation input is used as the RC4 key and the RC4 output bytes are used as (or used to form) the entropy redistribution operation output.

The encrypting device and decrypting device have a secret key encryption function (or set of functions) ENC( ) with a corresponding decryption function DEC( ). In some embodiments, such as those with fixed-length messages, ENC( ) and DEC( ) may utilize conventional cipher constructions such as AES in ECB or CBC mode. Constructions of ENC( ) and DEC( ) for other embodiments are described later with respect to FIG. 13 and FIG. 14, respectively.

Exemplary Embodiment in FIGS. 1 and 2

This section describes an exemplary embodiment of the general technique for verifiable leak-resistant encryption and decryption. This first exemplary embodiment uses key chaining and ciphertext hash chaining.

Encryption

For convenience, following the traditional nomenclature in cryptography, we use the term "plaintext" to refer to the data to be encrypted. As those skilled in the art will understand, this does not necessarily mean that the input data is human-readable, and indeed, nothing precludes such data from itself being compressed, encoded, or even encrypted, prior to its being protected with the techniques of this patent. Similarly, those skilled will understand that the term "data" encompasses any quantity being processed, and could include, without limitation, content, data, software, code, and any other type of information.

Given a sensitive plaintext data message D to be protected, and with knowledge of a shared base secret cryptographic value KROOT, the encrypting device performs the following steps, as outlined in FIG. 1. First it decomposes the sensitive plaintext data D into a sequence of L segments D1, ..., DL (step 100), where (L≥1), each of which is small enough to fit into the memory for incoming segments in the receiver(s). In addition, the size of each of these segments should be sufficiently small to meet the leakage requirements of the application and implementation. The segments can be, but are not necessarily, the same size. In addition, other variants can also support segments of unlimited size by changing keys (e.g., within ENC( ) and DEC( ) as will be shown below with respect to FIGS. 13 and 14.

The encrypting device also generates (step 101) a nonce N which (as will be shown below) may be used as a message identifier (or a precursor thereto) for use in connection with the encryption of D. For example, the nonce could be generated using a true random number generator, a pseudo-random number generator, some combination of true and pseudorandom number generators, a counter value or other (preferably unique or seldom-repeating) parameter, or by deriving N from keys and/or data (including without limitation D, e.g., by setting N to the hash of part or all of D) available to the encryption device. In FIG. 1, for a given KROOT, the value of N used to encrypt a particular message is preferably not used to encrypt any other message (or if so, any reuse should be limited, unlikely and/or infrequent).

In the exemplary embodiments that follow, a message identifier H1 is formed using nonce N. In the most straightforward implementation, in which N serves as the message identifier, H1 may simply equal N. As another example, in which N serves as a precursor to the message identifier, the encrypting device could compute H1 (step 102) as the hash of N using the function h( ) Hashing is useful in situations where one wishes to produce a fixed-size message identifier, for example, to permit the incorporation of longer data values (such as text strings) while operating on shorter quantities for computational efficiency, or to convert variable-length data values to a uniform length message identifier for computational simplicity, or to reduce any ability adversaries may have to influence the selection of H1. Of course, hashing is only one way to produce the message identifier, and those skilled in the art will appreciate that functions other than h may be employed to produce H1.

After computing H1, the encrypting device computes a message key, KMESSAGE, using the shared base secret cryptographic value KROOT and H1 (103) as input to a leak resistant, key-tree-based key derivation process. For convenience of discussion, the key derivation process is presented here in the context of encryption (e.g., performed by the encrypting device), and more specifically, in the context of the first exemplary encryption process of FIG. 1. However, the same key derivation process will also be used in the first exemplary decryption process of FIG. 4, in which case it will be performed by the decrypting device. Similarly, the key derivation process will also be used in connection with other processes, including the exemplary encryption processes of FIGS. 5, 11 & 13, and the exemplary decryption processes of FIGS. 6, 12 & 14.

An exemplary key derivation process is diagrammed in FIG. 2. The process begins with a starting point of the tree, which is denoted KSTART (201), and a path P1 . . . PQ (202). For example, in FIG. 1 step 103 above, KSTART is the value of the shared secret key KROOT and path P1 . . . PQ (202) is determined by H1. (The conversion of H1 into P1 . . . PQ is discussed below.) The path specifies a succession of entropy redistribution operations to be applied to KSTART.

In an exemplary implementation, message identifier H1 is decomposed into Q parts P1, P2, . . . , PQ. In an exemplary decomposition, each part Pi is an integer from 0 thru (b−1) (e.g., if b=4 then each Pi is a two-bit value (0, 1, 2, or 3)). Likewise, if b=2, each Pi is a single bit (0 or 1). Hence, the path parts P1 . . . PQ can be used to specify a specific path from KSTART to KSTART,PATH by applying functions f0( ) f1( ), . . . , fb−1( ) to produce a plurality of intermediate keys leading to KSTART,PATH as follows. First, the function fP1 is applied to KSTART (203) to yield an intermediate key KSTART,P1, followed by the application of fP2 on KSTART,P1 to yield the intermediate key KSTART,P1,P2 (204) and so on, until the final application of fPQ on the intermediate key KSTART, P1, P2, . . . , PQ−1 (205) to yield the final derived key, KSTART, P1, P2, . . . , PQ (206). Note that the derivation of each intermediate key depends on at least one predecessor key (e.g., in the case of FIG. 2, its immediate parent) and the relevant portion of the message identifier. For convenience, we shall denote this final derived key with the notation KSTART,PATH (indicating the key that was reached by starting with KSTART and following PATH). Likewise, in the case of FIG. 1 step 103, the final derived key (the message key which is assigned to KMESSAGE) is denoted KROOT,H1 since the starting key is in fact KROOT, and the path is in fact P1, P2, . . . , PQ which is simply the decomposition of H1. (In alternate embodiments, KMESSAGE may be derived from KROOT,H1, e.g., by hashing KROOT,H1. Either way, KMESSAGE is based on KROOT,H1.)

At step 104, the data segment(s) are encrypted using at least one cryptographic key based on said message key KMESSAGE, producing ciphertext E=E1, . . . , EL is from the input segment(s) D=D1, . . . , DL. An exemplary embodiment for step 104 is shown in FIG. 3, which depicts the steps and states involved in computing the encrypted segments E1, . . . , EL.

The process of FIG. 3 uses KMESSAGE to compute L individual segment encryption keys, Ki (i=1 to L), each key being used to encrypt a corresponding segment Di (i=1 to L) of the secret message data D. First, the function g( ) is applied to KMESSAGE to yield K1 (302), the encryption key to be used for the first segment. Then, the function g( ) is applied to the key K1 to yield K2, the encryption key for the second segment (303), and so on. Finally, the function g( ) is applied to key KL−1 to produce KL the encryption key for the final segment (305). We refer to this type of process as key chaining because the encryption keys are chained to one another.

After the L keys K1, . . . , KL for encrypting the L segments have been determined, the encryption of the segments proceeds as follows. The final (L'th) segment is processed first, where the plaintext input (306) to the ENC( ) function is the L'th data segment DL, concatenated with message integrity value computed by cryptographically hashing the entire plaintext D1 . . . DL. (The inclusion of the hash of D1 . . . DL is optional; embodiments may omit this, or concatenate other data such as sequence of '0' bytes or some other form of padding). This L'th plaintext segment is encrypted by the key KL to yield the encrypted segment EL (307).

Next, the L−1'th segment is processed at (308) by applying the hash function h( ) to EL, appending this hash value to data segment DL−1, and using the result as the encryption input to the L−1'th segment. At (309), the L−1'th plaintext segment is then encrypted using the key KL−1 to yield encrypted segment EL−1. This process is repeated for the other segments. For instance, the encryption input (310) corresponding to the second plaintext segment is composed of the second data segment D2 followed by h(E3), the hash of the third encrypted segment, and input (310) is then encrypted using the key K2 to yield the encrypted segment E2 (311). Finally, the encryption input (312) corresponding to the first plaintext segment is composed of the first data segment D1 followed by h(E2), the hash of the second encrypted segment (311), and input (311) is then encrypted using the key K1 to yield the encrypted segment E1 (313). (As a variant of the foregoing, the subsequent segment hashes do not need to be encrypted, e.g., Ei could be formed by encrypting Di then concatenating the encryption result with the hash of Ei+1.)

The encrypted segments E1 . . . EL form the ciphertext E. Step 104 in FIG. 1 is then completed. Using the hash of each Ei+1 in the computation of Ei effectively chains together the encrypted values, which serves to enable decrypting devices to detect modified (or defective) ciphertext segment(s) prior to decrypting the defective segment(s). We refer to this as "ciphertext hash chaining." In the example shown above, each ciphertext segment Ei (1<i<L) depends on the hash of the next ciphertext segment, e.g., a validator V is used to authenticates the hash of the first ciphertext segment (E1), then E1 yields (after decryption to D1 if necessary) the expected hash of E2. Likewise, E2 yields (after decryption if necessary) the hash of segment E3, and so forth.

Note that the process of FIG. 3 can still be performed where all the data is in one segment (i.e., L=1) (e.g., because the input message is small or an encryption process ENC( ) such as the process shown in FIG. 13 is employed). For the L=1 case, only K1 is required and K1=g(KMESSAGE). Alternately, KMESSAGE may be used directly as K1, in which case the operation go can be omitted altogether. As described above, inclusion of the hash of D1 . . . DL (which, in this case, would just be D1 since L=1) is optional. The result of the process E=E1, since this is the only segment.

Referring back to FIG. 1, after the data segments Di have been computed, a validator V is computed that will enable authorized recipients of the encrypted message to authenticate the ciphertext prior to decryption. First, a value H2 is calculated (105) as the hash of the first encrypted segment E1. Recall that the first segment E1 incorporates the hashes of all other segments. Thus, the hash of E1 actually reflects the contents of all the segments, including segment E1, and can be used to verify that none of the segments has been changed. (Optionally, in addition to E1, the input to the hash producing H2 may also include additional information about the message, such as the length, version number, sender identity, value of N, etc.).

Next, the encrypting device uses a secret key to compute V (106), which is a validator of the message identifier and ciphertext segment(s) Ei. Validator V is computed using the hash of at least one ciphertext segment (e.g., the hash H2=h(E1)) and an initial secret (e.g., KMESSAGE, or other values as described in the following paragraph). Computation of V may be performed using the leak resistant, key-tree-based key derivation process described in FIG. 2, with the starting key KSTART being KMESSAGE and the path being determined using H2 (106). Thus, the derivation of V includes computing a plurality of successive intermediate values leading to V, where each depends on at least one predecessor (e.g., in the case of FIG. 2, its parent value) and the relevant portion of the hash (e.g., H2). Note that the functions fi( ) the value b, etc. may be (but are not required to be) the same as were used in (103). This process results in the derivation of the key KMESSAGE,H2 which is (or is further processed to form) the validator V.

The foregoing description commenced with KMESSAGE in deriving the validator, but alternate embodiments may start with a different value. For example, the key KMESSAGE at step 104 and the key KMESSAGE at step 106 may be different from each other but both derived from KROOT, H1. Likewise, the key used at step 106 may be derived from the KMESSAGE used at step 104, or vice versa, or a different base key (besides KROOT) may be employed as KSTART. Of course, KROOT itself may even be used as KSTART (e.g., if H2 is a hash of N and/or H1 and one or more ciphertext segments).

The validator, as utilized in this patent, is a verifiable cryptographic proof that some putative ciphertext is an unmodified version of an encryption of some plaintext message data associated with a particular message identifier, and was produced by an entity with access to a secret cryptographic value. The validator constructed at step 106 can be conveniently validated by a recipient, such as a decryption device, in a manner that avoids susceptibility to differential power analysis and related external monitoring attacks. In addition, the validator creation process (i.e., the performance of step 106) also enables the encryption device to avoid susceptibility to differential power analysis and related external monitoring attacks.

After computing the validator, the encryption process is complete. At step 107, the result is output. The output data consists of the information (if any, e.g., nonce N) required to enable a recipient to derive the message identifier, the validator V, and the encrypted result E (comprising encrypted segments E1, . . . , EN). By combining key chaining and ciphertext hash chaining, this type of encryption process is able to yield cryptographically-strong output with message authentication, while avoiding the re-use of secret keys located in the encrypting device in ways that would facilitate differential power analysis and related attacks against the encrypting device. The encryption result is created in a form which enables a decryption device to perform the decryption without re-using secret keys in ways that would facilitate differential power analysis and related attacks against the decryption device. The key-tree process limits the re-use of keys in the formation of KMESSAGE and the validator V, while the ciphertext hash chaining method limits the use of keys used in the data encryption.

The next section explains how the output data can be subsequently decrypted by the decrypting device.

Decryption

FIG. 4 shows an exemplary decryption process corresponding to the exemplary encryption process of FIGS. 1 and 3. As stated earlier, this requires that both the decryption device and the encryption device have the ability to derive the same message identifier (e.g., because each device knows nonce N it can compute H1), base secret cryptographic value KROOT, cryptographic functions f( ) g( ) and h( ) The exemplary decryption process will use the same key derivation process (and key chaining) depicted in FIG. 2.

The exemplary decryption process begins at step 400 with obtaining (e.g., over an untrusted digital interface) the putative result of the encryption (namely, the message identifier (e.g., nonce N), the validator V, and the encrypted result E comprising segments E1, . . . , EN). At step 401, the device next computes the value H1 by hashing the received nonce N. Note that, unless the nonce was received incorrectly, the derived H1 will equal the H1 used in the encryption process. At step 402, the decrypting device computes the value H2 by hashing the segment E1 (and, if previously used during the encryption, other information about the message that was incorporated into the derivation of H2). At step 403, the device attempts to compute the message key, KMESSAGE, using the leak resistant, key-tree-based key derivation process described in FIG. 2, with KSTART=KROOT and PATH=H1. At step 404, the device computes the expected validator V', by using the same leak resistant, key-tree-based key derivation process as the encrypting device (e.g., the process in FIG. 2 using the key KSTART=KMESSAGE and PATH=H2). At step 405, the computed value V is compared with the received validator V. If the expected validator V' does not match the provided validator V, the process terminates with an error (step 406) since the provided data may have been corrupted or maliciously modified, or some other error has occurred.

If the check at step 405 is successful, then the process moves to step 407 where a counter i is initialized to the value 1, a key register K is initialized to the result of computing g(KMESSAGE) which is the key for decrypting the first encrypted segment E1 (i.e., the value of K1 which is labeled 302 in FIG. 3). Also at step 407, a variable H is initialized to H2. The following operations are then performed in a loop as shown FIG. 4. First, the hash of the next ciphertext segment to be decrypted (i.e., h(Ei)) is computed and compared with the expected hash H (step 408). If the comparison fails, the encrypted segment has been altered, so the process terminates with an error (409) and no further decryption is performed. If the comparison succeeds at step 408, the segment Ei is decrypted at step 410, using the decryption function DEC( ), with the key K to yield the decrypted segment, which is interpreted as containing the plaintext Di followed by the purported hash of the next ciphertext segment. H is set to this purported hash value. Next, at step 411, a check is performed to see if all the L segments have been decrypted (i.e., whether the counter i equals L). If the counter has not yet reached L, then in step 412, the counter i is incremented and the register K is updated to the decryption key for the next segment by computing K=g(K), and the process is repeated from step 408 onwards. If step 411 determines that i has reached L, a check is performed at step 413 to see if H equals the expected pad data (e.g., the hash of D1 . . . DL). If this check fails, the decryption ends with a failure condition (414). If the check succeeds, then the decryption process is successful and the recovered decrypted output D=D1, . . . , DL is returned at step 415.

Note that in this embodiment, the decryption process can be done in a streaming manner (i.e., the decryption device could initially obtain N, V and E1 and then receive the remaining segments E2, . . . , EL one at a time), and still be able to carry out the steps outlined above. Streaming operation is, for example, useful if the decrypting device lacks sufficient memory to hold the entire message, or if initial portions of the decrypted data need to be available before the all of the data has been received and decrypted.

Second Exemplary Embodiment

This section describes a second exemplary embodiment of the general technique for verifiable leak-resistant encryption and decryption. In contrast to the first exemplary embodiment which used ciphertext hash chaining, the second exemplary embodiment uses plaintext hash chaining. However, in both cases, the re-use of keys is controlled at both the encrypting device and the decrypting device to prevent differential power analysis and related attacks.

Encryption

The second exemplary embodiment of encryption by the encrypting device is shown in FIG. 5 which, for the sake of conciseness, is depicted as a combined process diagram and state diagram. The encrypting device creates or obtains the message to encrypt, D, and a message identifier N, which may be a counter, randomly-generated value, plaintext hash, etc.

The input message D is divided into a sequence of segments D1, . . . , DL (although L=1 is permitted), and these segments are used to create the plaintext segments B1, . . . , BL as follows. First, segment B1 (501) is formed by concatenating message segment D1 with the hash of any desired message data (denoted as X, which may include elements such as length L, message identifier N, a transaction identifier or counter, etc.) Next, B2 (502) is formed by concatenating D2 with h(B1) (i.e., the hash of B1). Each subsequent Bi up to BL-1 is then formed by concatenating Di with the hash of Bi-1. Finally, the last plaintext segment BL (504) is formed by concatenating DL with h(BL-1).

The next steps of the process (505-508) generate encryption keys for each of the plaintext segments using a key chaining process so that, similar to the first exemplary embodiment, each encryption key is directly or indirectly based on the message key. In the second exemplary embodiment, the first encryption key K1 is simply set to the value of message key KMESSAGE derived (505) by computing h(N) and then K1=KMESSAGE=KROOT, h(N) using the leak resistant, key-tree-based key derivation process as described in FIG. 2 with KSTART=KROOT and PATH=h (N). Key Ki for i>1 is computed as g(Ki-1), where g( ). Thus, the second key K2 is the result of computing g(K1) (506). This process is repeated so that the L-1'th key (KL-1) is computed as g(KL-2) (507), and the final segment key KL is computed as g(KL-1)(508).) Thus, every key Ki is based on (e.g., equal to or derived using) the message key KMESSAGE.

The next step in the process is the encryption of each of the plaintext segments B1, . . . , BL with the corresponding keys K1, . . . , KL to yield the encrypted segments E1, . . . , EL. For instance, encrypted segment E1 is created by encrypting B1 with K1 (509), E2 is created by encrypting B2 with K2 (510), and so on, with EL-1 created by encrypting BL-1 with KL-1 (511), and EL is created by encrypting BL with KL (512). The encrypted result E consists of the segments E1, . . . , EL.

The next step in the process is the computation of the validator V for the encryption (513). First, the hash function h( ) is used to compute h(N∥E1∥ . . . ∥EL∥h(BL)), where "∥" denotes concatenation. Next, Z=h(N∥E1∥ . . . ∥EL∥h(BL)) is computed, then KROOT, Z is computed using leak resistant key-tree-based key derivation process (e.g., as described in FIG. 2, with KSTART=KROOT and the PATH=Z). The validator V is then computed as the hash of the key tree result (i.e., h(KROOT,Z)). Finally, the result of the encryption process is provided, comprising N, h(BL), E, and the validator V (514).

The encryption process above can be employed in systems where the input data D arrives by streaming, or where for other reasons D cannot be processed all at once (e.g., because of memory limitations). In this case, the encrypting device commences by obtaining N, h(X), and K1. In addition, a running hash computation is initialized with N.

1. Create or obtain N
2. Initialize running hash calculation
3. Let H=h(X)
4. Let K=$K_{ROOT,h(N)}$
5. Update running hash calculation with N
6. Let i=1
7. Receive input data $D_i$ (e.g., streaming in)
8. Create $B_i$=concatenation of Di and H
9. Let H=h($B_i$)
10. Create $E_i$=ENC(K, $D_i$)
11. Update running hash calculation with $E_i$
12. Output $E_i$
13. Increment i
14. If more there is input data, go to step 7
15. Update running hash calculation with H
16. Finalize running hash calculation and store in Z
17. Compute V=h($K_{ROOT,Z}$)
18. Output H (which equals h($B_L$)), N, V Decryption The process of decryption is illustrated in FIG. 6. At step 600, the decrypting device receives (typically from an untrusted interface) the purported results of the encryption process, namely E, h(BL), nonce N, and validator V. The decrypting device divides E into E1, . . . , EL, initializes a counter i to be 1, and sets a register H to be the received value hash h(BL). The length of the message L is also received or determined (e.g., if a segment size of 1 kilobyte is used for all but the last segment, which may be less than 1 kilobyte, then L is the length of the message in kilobytes, rounded up). At step 605, the decrypting device computes Z=h(N∥E1∥EL∥H), where "0" denotes concatenation. At step (610), the decrypting device computes the value of KROOT,Z using the leak resistant key-tree-based key derivation process described in FIG. 2, with the root being KSTART=KROOT and the PATH=Z., and then hashes the result to yield h(KROOT,Z). At step 620, it compares the computed h(KROOT,Z) with the received validator V. If the result does not equal V, there is data corruption and the process is stopped at 611 without performing any decryption. If the check succeeds, then at step 620 the decrypting device computes h(N), then initializes key register K with the result of computing KROOT, h(N) using the leak resistant key-tree-based key derivation process described in FIG. 2, with KSTART=KROOT and PATH=h(N) and sets a counter i to be 1.

Next, the following operations are performed in a loop: At step 630, the segment Ei is decrypted with the key in key register K to produce a plaintext segment Bi which consists of a data segment Di and a hash value. At step 640 the hash from of the decrypted current segment is checked. For the first segment (i.e., i=1), the hash is compared against h(X), where X consists of the same fields as X during encryption. For segments after the first one (i.e., i>1), the hash from Bi is compared against the hash of the prior segment (i.e., h(Bi−1)). If the comparison fails, the decryption process fails at step 641. Otherwise, at step 650, the message portion of Bi (i.e., Di) is added to the output buffer (e.g., in RAM), and key register K is advanced to the next segment key by computing g(K) then storing the result in K. The counter i is also incremented by 1. At step 660, the value of i is compared with L and, if the value of i does not exceed L, the decryption process loops back to step 630. Otherwise, the decryption process is complete and at step 670, where the hash of the last plaintext segment (i.e., h(BL)), is compared to the received hash H. If the comparison at step 670 fails (i.e., the values are not equal), an error has occurred and the decryption fails (step 671). Otherwise the result data D1, . . . , DL are output in step 680.

In this embodiment, the hashes of the plaintext are chained, with plaintext segment Bi containing the hash of the plaintext Bi−1. This chaining, while not strictly necessary for leakage resistance, provides the additional property that any faults that occur during the decryption process can be detected because the plaintext is verified to be that same as what was encrypted. Thus, this embodiment is advantageous for use in environments where there is potential for corruption the decryption process.

Systems, Applications, and Variants

Up to this point, this patent has described a general technique for leak-resistant encryption and decryption, together with some exemplary embodiments of that technique. This section will describe some exemplary systems and/or applications in which the foregoing can be utilized, as well as additional variants of aspects of the exemplary embodiments described above.

Secure Firmware Loading

FIG. 7 shows the application of verifiable leak-resistant cryptography for securely loading sensitive firmware on a central processing unit (CPU), e.g., as part of a so-called system on a chip (SoC). For convenience, depending on context, the reference numerals may refer to steps in a process, and/or to quantities used (or produced) by such process steps. In this embodiment, the SoC consists of a single integrated circuit (700), containing a CPU (703), and various types of memory. The memories may include, without limitation, random access memory (RAM) (701) from which code may be executed, read-only-memory (ROM) (704) containing trusted bootstrap code, and a secret state storage memory (702) that holds a shared cryptographic secret KROOT. The key storage memory could be implemented using a variety of techniques, such as, without limitation, fuses/antifuses, battery backed RAM, and EEPROM. The SoC may have an external power input (707) which may receive power from an untrusted source (e.g., potentially under the control and/or observation of adversaries). An externally supplied clock (708) may also be received (and may be used with PLLs to form additional clocks). The SoC has a cryptographic hardware component (705) with an AES engine for data encryption and decryption, a hash function engine, such as, without limitation, a SHA-1 or SHA-256 or a AES based hash function engine, and an implementation of the leak resistant, key-tree-based key derivation process based on FIG. 2, with functions f0( ) . . . , fb−1( ) implemented using the hash function and/or the AES function or their variants. It should be obvious to those skilled in the art that, in other embodiments, the entire functionality of the cryptographic hardware component (705), or some subset thereof could be performed by in software (e.g., by the CPU).

Upon bootstrap from the trusted bootstrap code in ROM, the SoC loads its sensitive software/data, over an untrusted interface (706), from an external, untrusted storage device, which in this embodiment is flash memory (709). To protect the sensitive software/data from disclosure or unauthorized modification, it is encrypted using the verifiable leak-resistant techniques (e.g., as shown in FIG. 1 or 5) by a device manufacturer or other code issuer using the shared secret cryptographic value KROOT. The encryption result is stored in the flash memory (709). The SoC first loads the encrypted code/data from the flash memory (709) to its internal RAM (701). It then performs the leak resistant decryption (e.g., as shown in FIG. 4), where the process is implemented in the trusted bootstrap code store in ROM (704) cryptographic hardware component (705), and is performed using the shared secret key KROOT from keystore (702). If successful, this process creates a validated and decrypted sensitive code/data image within RAM memory (701), which may then be executed. In case the decryption process fails, the encrypted code/data (and any partially decrypted code/data) in RAM is flushed and the operation restarted from the beginning when required.

In an optional enhancement to this embodiment, security is complemented by storing a minimum acceptable software version number in fuses, battery backed memory, or other local storage of the device onto which the software is to be loaded. All software to be loaded into the device would carry a version number, and the device would only accept software with a version number greater that the minimum. In addition, some software versions might specifically instruct the SoC to update the minimum acceptable software version number, thereby preventing malicious rollback of software to a prior version that was deemed unacceptable. The foregoing anti-rollback methods could be implemented independently of (i.e., as an adjunct to) the verifiable leak-resistant operations. Alternatively, the anti-rollback methods could be implemented as part of the message identifier, the validator, or the other secured quantities used in the verifiable leak-resistant operations.

Those with ordinary skill in the art will easily recognize that SoC applications are not limited to the specific architecture presented herein, and SoCs or other devices with a different internal architecture and/or components from the embodiment presented in FIG. 7 may be protected.

For example, FIG. 8 shows the application of verifiable leak-resistant cryptography to a secure processor architecture (800). For convenience, depending on context, the reference numerals may refer to steps in a process, and/or to quantities used (or produced) by such process steps. In this setting, the device contains a CPU, a keystore that holds internal secret state including a base secret cryptographic key KROOT. Non-volatile storage, such as, without limitation, fuses (801) may be employed for storing the internal secret state. The cryptographic hardware subcomponent (804) encrypts and/or integrity protects and/or replay protects all data moving out of the on-chip data/instruction cache (803) to external insecure RAM memory (806), and decrypts and/or integrity checks and/or replay checks all data being fetched from external insecure RAM memory. In addition, all code is stored in encrypted and integrity protected form in the insecure flash (805) and is decrypted and integrity checked when brought into the on-chip data/instruction cache (803). Exemplary processor architectures of the background art whose security could be improved through the addition of verifiable leak-resistant cryptography include, without limitation, the Secure Blue design from IBM (announced in an IBM press release entitled "IBM Extends Enhanced Data Security to Consumer Electronics Products" on Apr. 6, 2006) and the AEGIS design from MIT (described in AEGIS: Architecture for Tamper-evident and Tamper-resistant Processing, Proceedings of the 17th Annual International Conference on Supercomputing, pages 160-171, 2003).

The use of verifiable leak-resistant cryptography substantially improves the security of existing processor designs by providing protection against monitoring attacks. In particular, this embodiment enhances the cryptographic hardware subcomponent (804) to include a hash function and a key tree processing capability that reuses the (e.g., AES) encryption capability of an existing secure processor design and implements the steps and method of the first exemplary embodiment to create a secure leak-resistant secure processor. In particular, any data written from cache (803) to the RAM memory (806) is encrypted using the leak resistant encryption process (e.g., as shown in FIG. 1) and any code read from untrusted flash (805) and untrusted RAM is decrypted using the leak resistant decryption process outlined in FIG. 4. When data are written to a particular segment, a counter corresponding to the segment is incremented, and the counter value is incorporated in the encryption and/or integrity check creation process for the segment, thereby enabling the detection of attacks that involve substitution of old data.

FPGA Bitstream Loading

The logic to be loaded into a field programmable gate array (FPGA) often contains highly sensitive trade secrets, cryptographic secrets, and/or other sensitive information that needs to be protected from disclosure or copying. This loaded logic, or upgraded logic is typically supplied to the FPGA as a bitstream from an external source, such as, without limitation, a flash memory device or a CPU or some other source (907). Some FPGAs contain nonvolatile memory for storing configuration data, while others must be re-loaded each time the chip is powered on. Existing FPGAs have the ability to decrypt bitstreams, typically using a key that is held a battery-backed memory or stored locally (such as using on-chip flash, EEPROM, or fuses). The FPGA decrypts the supplied encrypted bitstream before (or while) installing it into the programmable slices present within the FPGA. Differential power analysis attacks and related external monitoring attacks can be attempted against the bitstream decryption processes, posing a serious security risk as a successful attack can result in disclosure of the bitstream decryption key and/or the bitstream itself.

Referring to FIG. 9, verifiable leak-resistant cryptography can be used to create a secure bitstream decryption capability on an FPGA. Prior to decryption, the sensitive bitstream is encrypted by an external device (using software, hardware or some combination thereof) using a leak-resistant encryption process (e.g., as described in the first exemplary embodiment), producing the encrypted bitstream. The encrypted bitstream may be located (907) in an untrusted memory, such as an external flash or hard drive, or retrieved from an untrusted source such as a CPU etc.

Within the FPGA, the cryptographic secret KROOT for leak-resistant decryption is kept in the keystore (902) which stores the internal secret state, and which may be implemented using technologies such as, without limitation, fuses, battery-backed RAM (902, 903), EEPROM, flash, etc. The FPGA (900) receives the encrypted bitstream over interface (906). This bitstream could, for example, have been encrypted using either of the first embodiment or the second exemplary embodiment (corresponding to FIGS. 1 and 5).

If the embodiment of FIG. 1 was used for encryption, the FPGA first receives nonce N, validator V, length L, and initial segment E1. E1 is stored in encrypted segment buffer (905). Using a leak-resistant decryption process as described above (e.g., see FIG. 4), the hash of E1 is computed, and validator V is verified, with KROOT, L, and the hash, yielding (if successful) KMESSAGE or a fatal error (in which case the process halts). If successful, the FPGA uses the segment decryption processing component (904) to perform the leak resistant decryption process on E1. The decryption of E1 yields the hash of segment E2, which is loaded, verified, and decrypted. The process continues one segment at a time, until the final segment is decrypted and verified. If an error occurs, the process halts and all partial FPGA decrypted data are wiped. (Upon failure the process can be re-started again from the beginning.) One or more status registers 910 are used to track the status of the bitstream loading process (e.g., tracking whether the process is in-progress, failed, or complete). The status can also be exported for diagnostic purposes and for use by external components. Once all segments have been loaded successfully, the FPGA is now configured and can be used (e.g., the FPGA can now permit I/O, clocking, etc. to be applied to the loaded bitstream image). FPGA operation can be prevented until the bitstream is fully loaded (e.g., to avoid revealing information about an incomplete FPGA image and to avoid unpredictable behavior of the overall circuit arising from incorrect FPGA configuration).

If the second embodiment of FIG. 5 was used for encryption, the FPGA first receives E, V, N, and h(BL), and stores E in a buffer. The FPGA's segment decryption processing component 904 then uses the method described in FIG. 6 to validate and decrypt the provided encrypted segments. Status register(s) 910 are used to track the status of the bitstream loading, validation, and decryption processes, and any serious error results in the halting of the process and the wiping of any partial decrypted data.

Network Communications and Other Packet-Based Applications

FIG. 10 shows the application of verifiable leak-resistant cryptography to protecting network communications from external monitoring attacks. In this embodiment, multiple network devices, such as Device A (1000), Device B (1030) and Devices C, D, E, etc. (1040) communicate with each other over a network (1020). Some or all of these communications may contain sensitive information, making it useful to encrypt and authenticate the data. Moreover, some of these devices (such as Device A in this embodiment) are required to protect their cryptographic computations and keys from external monitoring attacks.

Device A has a keystore (1001) to store a table of shared cryptographic root keys with other devices it needs to communicate with. These keys may have been previously stored, or may be negotiated (e.g., using public key cryptography). Methods for using public key cryptosystems to negotiate keys are well known in the background art, and are utilized in protocols such as SSL and IPSEC. This embodiment could easily be integrated into these or other protocols.

Outbound packets or data segments to be encrypted originate from an application, operating system, driver, or other component (1002) and enter plaintext packet buffer (1003). Each packet is then processed using the segment encryption/decryption processing component (1004), where it is encrypted using a verifiable leak resistant encryption method (e.g., as described in FIG. 1). The root key for this encryption is the shared key between Device A and the destination device, which is obtained from the keystore (1001). For this processing, the message identifier nonce N may be any (preferably) unique value, including a counter. For example, the nonce could equal a packet identifier, a TCP sequence number with possibly the incorporation of additional most-significant bits to prevent overflows, the hash of a value, a random value, etc. For each packet, the leak resistant encryption operation produces an encrypted segment and a validator V. The nonce may be transmitted or may be implicit (e.g., based on the number of packets received previously). The encrypted segment, V, and any other required data are assembled into an outgoing packet and moved to the network interface component (1006) and then to the network (1020) for routing to the appropriate destination device.

For inbound encrypted packets, it is assumed that the sending device has performed the encryption as described above. These packets are received from the network (1020) by the network interface component (1006) and then moved to the ciphertext packet buffer (1005). Each packet is then processed by segment encryption/decryption processing component (1004), where a leak-resistant decryption process (e.g., as described in FIG. 4) is performed. For this decryption process, (i) the shared key between the receiving and sending device (e.g., KROOT or a precursor used to derive KROOT) is obtained from keystore (1001), (ii) the nonce N is recovered from the packet or otherwise determined, (iii) the validator is verified against N and the encrypted packet, and (iv) if the validator is correct, the packet data are decrypted. The shared cryptographic secret between Device A and the sending device may be used as KROOT. If the decryption or validation fails, the packet is dropped. Otherwise, upon successful decryption, the decryption result can be provided to the application, operating system, driver, etc.

This process is outlined in FIGS. 11 and 12. FIG. 11 illustrates the verifiable packet level leak-resistant encryption process and FIG. 12 illustrates the corresponding decryption process. The verifiable packet level leak-resistant encryption process is the following: Given an input packet data D (1100) with the source and destination sharing a base cryptographic value KROOT, a message identifier N is generated in step 1101 (e.g., using a random source and/or information present in the packet D and/or some packet identifier such as a sequence number associated with the communication protocol). For TCP/IP communications, N can be constructed from a session identifier, the sequence number (optionally with additional most significant bits appended to prevent rollover), the source port, the destination port, and/or other values. Next, in step 1102, the hash of N is computed. (Optionally, this step may be omitted and N may be used instead of h(N) in deriving KMESSAGE.) Subsequently, in step 1103, message key KMESSAGE=KROOT, h(N) is computed using the leak resistant key-tree-based key derivation process described in FIG. 2, with KSTART=KROOT and PATH=h(N). The input packet data D is encrypted with the key KMESSAGE to yield the encrypted result E (1104).

Next the hash of E is computed (1105) (e.g., using SHA-256). Then the validator V for the encryption is computed as KMESSAGE,h(E) (1106) using the leak resistant key-tree-based key derivation process outlined in FIG. 2, with KSTART=KMESSAGE and PATH=h(E). Finally the output packet is formed to include V, E, and N (or any other information, if any, required to enable the recipient to recover N) (1107). The output data E is then transferred to a remote device (such as a remote computer over the Internet) in a packet.

As an optional optimization, if the encrypting device has multiple packets buffered for sending, it can encrypt multiple packets simultaneously such that only a single validator is required for all packets. For example, the encryption process may be performed as shown in FIG. 3, where each segment Di is a packet. Combining packets in this manner reduces the number of key tree operations required for both the sender and the recipient.

A corresponding verifiable packet level leak resistant decryption process is illustrated in FIG. 12. Given an encrypted packet including V, E, N (or data sufficient to recover N, e.g., a sequence number), and the shared cryptographic secret KROOT (1200), the decryption process proceeds as follows: First, the value of h(N) is computed (1201) is computed (or, if the encrypting device used N directly, then this step is omitted). Then the hash of E is computed (1202). Next KMESSAGE=KROOT, h(N) is computed at step 1203 using the leak resistant key-tree-based approach diagrammed in FIG. 2 with KSTART=KROOT and PATH=h(N). Next V'=KMESSAGE, h(E) is computed using the leak resistant key tree process outlined in FIG. 2, with KSTART=KMESSAGE and PATH=h(E) (1204). Subsequently, the decryption device checks whether V'=V (1205). If they are not equal, processing is stopped for this packet and the packet is discarded (1206). If the check succeeds, then E is decrypted with KMESSAGE to yield D, the plaintext packet (1207) (e.g., using the DEC( ) process shown in FIG. 14).

Smart Card Applications

Verifiable leakage-resistant encryption and decryption can be implemented in smart-cards (e.g., in connection with protocols where the smart-card is required to perform encryption and/or decryption in a manner that is secure from differential power analysis and related external monitoring attacks). Examples of such systems and protocols include, without limitation, the derivation of keys (control words) for the decryption of pay television signals, payments (including off-line payments), identity verification/network login, mobile telephone SIM cards, and transit passes. The exemplary cryptographic techniques disclosed in this patent can be used to ensure that the secret keys within smart-cards are protected from external monitoring attacks while performing such protocols. Smart cards (or other security chips) can also be used to implement part or all of the leak resistant encryption or decryption processes utilized in a larger system, such as if the smart card implements the key-tree based key derivation process of FIG. 3 so that KSTART never needs to leave the smart card.

Mutual Authentication Applications

In many applications, two or more devices need to authenticate each other and/or exchange sensitive information amongst them. Example applications of such protocols include, without limitation: (i) authentication between a printer and a cartridge to ensure that both devices are genuine and not counterfeit; (ii) authentication between a set-top box and a smart-card to ensure that components are authentic (e.g., to prevent the introduction of stolen video decryption keys); (iii) authentication between a garage door and an opener; (iv) keyless entry systems (such as may be used in cars) which authenticate keys (e.g., prior to unlocking doors or starting the engine); (v) authentication protocols performed by frequently stolen items (such as car radios, GPS units, cell phones, etc.) to prevent stolen or tampered devices from being operated; and (vi) entry systems such as those found in secure buildings that authenticate keys/tokens prior to permitting entry. In these applications, challenge response protocols between the devices have traditionally been used both for mutual authentication and to set up a shared secret key for the exchange of sensitive information. Simple protocols to perform these authentications while resisting DPA can be constructed by using the methods of this patent to perform any required encryption or decryption operations. For example, a device can demonstrate its authenticity using techniques disclosed in this patent through its ability to supply a valid validator and/or decrypt a message.

Segment Encryption and Decryption with Intra-Segment Key Changes

This section describes exemplary variants of the ENC( ) and DEC( ) operations which can be used in place of conventional encryption processes (such as AES in ECB or CBC mode) in implementing the exemplary embodiments (e.g., as shown at step 320 of FIG. 3, step 410 of FIG. 4, step 509 of FIG. 5, step 630 of FIG. 6, step 1104 of FIG. 11, and step 1207 of FIG. 12). In the ENC( ) and DEC( ) variants shown in FIGS. 13 and 14 respectively, the cryptographic keys are changed frequently, for even greater security. Specifically, additional cryptographic key updates occur within the encryption of a data segment Di to Ei (or vice versa). Accordingly, we refer to these variants as implementing intra-segment key changes.

Other than the changes to ENC( ) and DEC( ) the remainder of the operations in the first and second exemplary embodiments can be implemented as previously described. For example and without limitation, the operations involving the initial message key KMESSAGE, the validator V, and so forth, need not be changed.

FIG. 13 shows an exemplary embodiment of an ENC( ) operation for encrypting data segments. FIG. 14 shows a corresponding exemplary embodiment of a DEC( ) operation. In this embodiment, these operations are built using the block cipher AES in cipher block chaining (CBC) mode, but it should be clear to those skilled in the art, that other block ciphers or encryption/decryption primitives or encryption modes could be used as well.

The inputs to the encryption process for segment i are segment key Ki (1301) and data segment Di (1310). The input data segment Di (1310) is divided into sub-segments Di,1 (1311), Di,2 (1312), etc. FIGS. 13 and 14 show the data segment D being divided into sub-segments of 3 AES blocks, although other sizes can also be used and algorithms other than AES may, of course, also be employed. (Smaller sub-segments increase computational overhead, while larger sub-segments cause keys to be used in more operations, increasing the potential for information to leak.) Segment key Ki is transformed with a hash operation m( ) yielding Ki,1 (1302) which is the key for the first sub-segment Di,1. If an initialization vector (IV) (1314) is to be used, it is XORed with the first AES block of Di,1. (If no IV is to be used, this XOR step may be omitted. If an IV is used, it can be authenticated, e.g., by incorporating it into the validator computation, or by deriving the IV from a validated value such as a message identifier.) The first bits of (Di XOR IV) are encrypted with AES (1315) using the segment key Ki,1 (1302), forming the first portion of ciphertext sub-segment Ei,1 (1320). This ciphertext portion is also XORed with the next bits of sub-segment Di,1 (1311), yielding another AES input which is subsequently encrypted using segment key K0 (1302) to produce the next portion of sub-segment Di,1 (1311). A similar cipher block chaining operation is performed to form the input to the third AES encryption, which is also performed with key Ki,1. The results of the three AES operations is the ciphertext sub-segment Ei,1 (1320). The fourth AES operation is performed on the first block of the next data sub-segment Di,2, (1312), and a new key is used, notably Ki,2 (1303), which is derived by applying m( ) to Ki,1 (1302). The last ciphertext from processing Di,1 becomes the IV (1317) for the first portion of Di,2 (1312). The encryption process continues until all blocks of all s data sub-segments have been encrypted, ultimately yielding the encrypted sub-segments Ei,2 (1321), . . . , Ei,s (1322), and where a new key is derived using m( ) for each sub-segment. Finally, the ciphertext sub-segments are assembled to form the final ciphertext segment Ei (1330).

Referring to FIG. 14, the decryption process DEC( ) is the reverse of the ENC( ) process. The subkeys Ki,1 (1402), Ki,2, (1403), etc. are derived from the segment key Ki (1401) using m( ) via the same process as for encryption above. The encrypted segment Ei is divided into sub-segments, each comprising one or more AES inputs, which are decrypted with the subkeys. After each decryption operation, the appropriate IV (if any) or prior ciphertext is XORed with the data. The final data are assembled to form the sub-segments (1420, 1421, 1432, etc.), which are in turn assembled to form Di (1430).

The ENC( )) and DEC( ) process above are examples which involve rapid key changes so as to provide greater leakage tolerance. Other segment encryption and decryption methods can be used, including the application of stream ciphers and/or block ciphers (such as RC4, SEAL, AES, DES, triple DES, etc.) in ECB, CBC, or counter (e.g., Galois counter) modes. For such operations where the same key is applied to all the data in a segment, it may be advantageous to limit the size of each segment (e.g., by dividing up the data into sub-segments as shown in FIG. 3) prior to encryption so as to limit that the number of operations performed with each key, thereby reducing the number of operations an adversary can observe being performed with each key.

Communications Channels

Data exchanges described herein may be accomplished in a wide range of possible manners. For example, and without limitation, conventional buses/interfaces (such as I2C, JTAG, PCI, serial I/O (including USB), PCI Express, Ethernet, etc.), wireless protocols (such as 802.11 family, Bluetooth, cellular telephony protocols, ISO14443, etc.), and intra-chip connections (such as APB, direct connections with other flip flops, etc.) may all be used. For each of the foregoing, the sending device(s) and receiving device(s)

would have appropriate interfaces (e.g., interfaces of the foregoing types) with can send, receive, or send and receive (as appropriate).

Alternate Forms of Data Validation Prior to Decryption

The exemplary embodiments presented thus far, have utilized the leak-resistant key-tree-based key derivation process (e.g., as illustrated in FIG. 2) to compute a validator of the ciphertext which can be verified safely prior to decryption. While this process is well suited to a broad range of applications, other techniques for creating a value that could serve a similar role, and may be adequate in certain settings. For example, in some embodiments the encryption process is not required to be resistant to external monitoring (but the decryption process does require such resistance) and/or algorithm-level countermeasures for public key digital signing processes (such as those described in U.S. Pat. No. 6,304,658) may be present. For these systems, digital signing (digital signature) operations may be used to construct a value which can be verified at decryption time to ensure that the ciphertext is unmodified. For example, the digital signature could authenticate the message identifier and at least one encrypted segment. Examples of public key digital signing algorithms include, without limitation, RSA, DSA, and elliptic curve DSA variants (including without limitation EC-DSA). The verification of a digital signature does not require any sensitive information, and accordingly may be performed prior to decryption. However, this flexibility comes at the cost of requiring public key signing logic within the encrypting device and public key verification logic within the decrypting device. It is also possible for a validator (or validator substitute) to be comprised of multiple symmetric validators, public key signatures, or other elements.

Non-Sequential Segment Key Derivation

Segment keys (e.g., K1, K2, . . . KL in FIG. 3) and sub-segment keys (Ki,1, Ki,2, etc. in FIG. 13) are not required to be derived sequentially. For example, keys can be derived in a hierarchical tree pattern, or more generally each key can be a function of any prior key(s), or could be independently derived from KROOT using the key tree construction, or keys could be derived using some combination of other keys and the key tree construction.

Reordering of Data Transmissions and Calculations

The ordering of data transmissions and operations can be altered. For example, the first exemplary embodiment described in FIGS. 1, 3 and 4 shows the encryption process proceeding from the last segment DL to the first segment D1 with each segment Di containing the hash of the encryption result, Ei+1, of the i+1'th segment. A separate validator is computed for the first encrypted segment E1 (e.g., see step 106). This approach can be advantageous for the decrypting device as shown in FIG. 4, since it does not need to buffer the entire encryption result before decrypting, whereas the encrypting device has to do so.

Alternatively, the encrypting device could encrypt the segments starting from D1 and ending with DL, with each segment Di+1 containing the hash of the encryption Ei of the previous segment. In this example, the segment D1 is (for example) extended by a string of 0's of size equal to the output length of the hash function to indicate it is the first segment. A validator, created using the key-tree is then computed using PATH=h(EL). For this variant, the decryption process is similar to FIG. 4, but proceeds in the reverse direction starting from the last encrypted segment to the first. Thus, the encrypting device no longer has to buffer the data segments, although the decrypting device now has to do so.

Substitution of Additional Validators for Hashes

Although some examples show hashes in data segments which authenticate subsequent encrypted segments, the subsequent segments can alternatively carry their own independent validator. For example, FIG. 3 shows first data segment (312) carrying a hash h(E2) to validate that segment E2 was not changed. However, such hash is not always required, and in some cases could be omitted (e.g., if the next segment instead carries a validator). This simplifies encryption somewhat, but increases computation time since more validators need to be computed and checked. In streaming applications or if storage/memory are limited, the additional computational effort may be justified given the benefit of avoiding the need to have the subsequent data available and buffered.

Variations in Hashing

In some diagrams, a single operation, such as h( ) in FIG. 3, is applied multiple times and/or is used for different uses. It is generally not required that these all be the same function. For example, different steps could employ different hash functions.

The output of hash function may be truncated, combined with other hash function outputs, or otherwise modified through post-processing. For example, SHA-2 produces a 256-bit output hash, but a shorter message identifier (such as 160-, 128-, 80- or 64-bits) may be desired. The function h( ) may use SHA-2 internally and return only some bits of its result.

Variations in Order of Operations

Some of the exemplary embodiments designate a specific order in which data elements are concatenated or combined. For instance, in FIG. 3, steps 303-312, the data Di is concatenated with the hash h(Ei+1). Other examples where data segments are concatenated in sequence before being hashed include FIG. 5, elements 501-504 & 513, in step 306 of FIG. 3. These specific orderings are just one example of a possible ordering, and a variety of other data orderings could be utilized in alternate embodiments.

Variations in Tree-Based Key Derivation

If operations (such as fi) are invertible, it is possible to use a value other than the top of the tree as the starting value. Similarly, computed values can be cached (e.g., if the message identifier is a counter, the initial operations will usually not change from one message to the next and therefore do not need to be recomputed).

Error Detection and/or Correction

It is well known in the art that incorrect outputs produced as a result of injecting faults in a cryptographic device's operation can yield information about sensitive data and keys. When practical, cryptographic operations can be checked to help prevent the release of incorrect computations which can compromise secrets. For example, a simple and effective technique is to perform cryptographic operations twice, ideally using two (or more) independent hardware processors and implementations, with a comparator to verify that both (or all) produce identical results. If the results produced by the units do not match, the comparator will prevent either result from being used and/or trigger other error conditions. Within individual cryptographic operations (such as hashing steps), error-detection and/or error-correction logic can also be employed to help prevent or detect situations where cryptographic operations are performed incorrectly.

The techniques disclosed in this patent may additionally provide some inherent resistance against certain types of fault injection attacks on the encryption and decryption processes. During the encryption process, a limited or partial fault introduced during the key tree based key derivation process would produce random, unpredictable results due to the usage of entropy redistribution functions within this process. In particular, corrupted intermediates will typically be mixed by subsequent entropy redistribution functions, which will limit adversaries' ability to mount attacks utilizing defective results.

Likewise, during decryption, faults or errors introduced within the ciphertext or the message identifier processing will generally resulting the validator being rejected. The second embodiment, with plaintext hash chaining, provides further resistance since the plaintext segments are independently authenticated for correctness prior to being output. Of course, the checking of operations and other well known fault-detection techniques may additionally be utilized.

Self-diagnostic functions such as a POST (power-on-self-test) and random number testing may also be incorporated to verify that cryptographic functions and random number generation capability has not been damaged.

Additional Host Environments and Form Factors

Several exemplary systems and applications for the utilization of verifiable leak-resistant cryptography were described above. However, as those skilled in the art will appreciate, the techniques described above are not limited to particular host environments or form factors. Rather, they can be used in a wide variety of applications, including without limitation: application-specific integrated circuits (ASICs), field programmable gate arrays (FPGAs), systems on chip (SoC), microprocessors, secure processors, secure network devices, cryptographic smartcards of all kinds (including without limitation smartcards substantially compliant with ISO 7816-1, ISO 7816-2, and ISO 7816-3 ("ISO 7816-compliant smartcards")); contactless and proximity-based smartcards and cryptographic tokens (including without limitation smartcards substantially compliant with ISO 14443); stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; defense systems; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; content protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

All of the foregoing illustrates exemplary embodiments and applications of the verifiable leak-resistant cryptography, from which related variations, enhancements and modifications will be apparent in the context of the spirit and scope of the disclosure. Therefore, the invention(s) protected by this patent should not be limited to the foregoing disclosure, but rather construed by the claims appended hereto.

What is claimed is:

1. A method for performing a security chip protocol, the method comprising:
   receiving, by processing hardware of a security chip, a message from a first device as part of performing the security chip protocol;
   retrieving, by the processing hardware, a secret value from secure storage hardware operatively coupled to the processing hardware;
   determining a path through a key tree based at least in part on the message, wherein the key tree comprises a plurality of nodes and one or more branches connected to each of the plurality of nodes, wherein each of the plurality of nodes are associated with a key and each of the one or more branches are associated with an entropy redistribution operation that, when applied to the key, generates an associated derived key;
   deriving, by the processing hardware, a validator at least in part from the secret value using a sequence of entropy redistribution operations and corresponding derived keys associated with the path through the key tree; and
   exchanging the validator between the security chip and the first device as part of the security chip protocol in order to authenticate at least one of the security chip or the first device.

2. The method of claim 1, wherein the message comprises a message identifier, and wherein the path is determined based at least in part on the message identifier.

3. The method of claim 2, wherein the path comprises a plurality of portions, the method further comprising:
   decomposing the message identifier into a plurality of parts; and
   determining each portion of the plurality of portions of the path using one of the plurality of parts of the message identifier.

4. The method as in claim 3, wherein each portion of the plurality of portions of the path is associated with a distinct entropy redistribution operation.

5. The method as in claim 1, further comprising:
   generating an expected response by the first device;
   comparing, at the first device, the validator to the expected response;
   determining, by the first device, whether the validator matches the expected response; and
   verifying at the first device that the security chip is authentic responsive to the validator matching the expected response.

6. The method of claim 1, wherein the security chip protocol corresponds to performing a secure transaction, and wherein the message comprises transaction data.

7. The method of claim 1, wherein the first device comprises at least one of a subscriber identity module (SIM) card or a transit pass.

8. The method of claim 1, wherein the security chip protocol corresponds to at least one of an authentication procedure between a set-top box and the security chip, a verification procedure for a network login, or access to one or more television signals.

9. A security chip, comprising:
   secure storage hardware to store a secret value; and
   processing hardware operatively coupled to the secure storage hardware, wherein the processing hardware is to:

receive a message from a first device as part of a security chip protocol;

retrieve the secret value from the secure storage hardware;

determine a path through a key tree based at least in part on the message, wherein the key tree comprises a plurality of nodes and one or more branches connected to each of the plurality of nodes, wherein each of the plurality of nodes are associated with a key and each of the one or more branches are associated with an entropy redistribution operation that, when applied to the key, generates an associated derived key;

derive a validator at least in part from the secret value using a sequence of entropy redistribution operations and corresponding derived keys associated with the path through the key tree; and provide the validator to the first device as part of the security chip protocol in order to authenticate at least one of the security chip or the first device.

10. The security chip of claim 9, wherein the message comprises a message identifier, and wherein the path comprises a plurality of portions and is determined based at least in part on the message identifier, wherein the processing hardware is further to:

decomposing the message identifier into a plurality of parts; and determining each portion of the plurality of portions of the path using one of the plurality of parts of the message identifier.

11. The security chip of claim 9, wherein the security chip protocol corresponds to performing a secure transaction, and wherein the message comprises transaction data.

12. The security chip of claim 9, wherein the first device comprises at least one of a subscriber identity module (SIM) card or a transit pass.

13. The security chip of claim 9, wherein the security chip protocol corresponds to at least one of an authentication procedure between a set-top box and the security chip, a verification procedure for a network login, or access to one or more television signals.

14. A system comprising:

a security chip comprising secure storage hardware and processing hardware operatively coupled to the secure storage hardware, wherein the secure storage hardware is to store a secret value and the processing hardware is to:

receive a message from a first device as part of a security chip protocol;

retrieve the secret value from the secure storage hardware;

determine a path through a key tree based at least in part on the message, wherein the key tree comprises a plurality of nodes and one or more branches connected to each of the plurality of nodes, wherein each of the plurality of nodes are associated with a key and each of the one or more branches are associated with an entropy redistribution operation that, when applied to the key, generates an associated derived key;

derive a validator at least in part from the secret value using a sequence of entropy redistribution operations and corresponding derived keys associated with the path through the key tree; and exchange the validator between the first device security chip and the first device as part of the security chip protocol in order to authenticate at least one of the security chip or the first device.

15. The system of claim 14, wherein the security chip protocol corresponds to performing a secure transaction, and wherein the message comprises transaction data.

16. The system of claim 14, wherein the first device comprises at least one of a subscriber identity module (SIM) card or a transit pass.

17. The system of claim 14, wherein the security chip protocol corresponds to at least one of an authentication procedure between a set-top box and the security chip, a verification procedure for a network login, or access to one or more television signals.

* * * * *